(12) United States Patent
Sutter

(10) Patent No.: US 7,036,449 B2
(45) Date of Patent: May 2, 2006

(54) MAN-MADE ISLAND RESORT COMPLEX WITH SURFACE AND UNDERWATER ENTERTAINMENT, EDUCATIONAL AND LODGING FACILITIES

(76) Inventor: Kimberly Michelle Sutter, 207 Somoma Aisle, Irvine, CA (US) 92618

( * ) Notice: Subject to any disclaimer, the term of this patent is extended or adjusted under 35 U.S.C. 154(b) by 112 days.

(21) Appl. No.: 10/674,724

(22) Filed: Sep. 30, 2003

(65) Prior Publication Data

US 2005/0274312 A1    Dec. 15, 2005

(51) Int. Cl.
   *B63B 35/44* (2006.01)
(52) U.S. Cl. .................................... 114/264
(58) Field of Classification Search ............... 114/364, 114/311
   See application file for complete search history.

(56) References Cited

U.S. PATENT DOCUMENTS

| | | | |
|---|---|---|---|
| 739,961 A | 9/1903 | Weisker | |
| 1,313,838 A | 8/1919 | Stodder | |
| 3,029,767 A * | 4/1962 | Donnan | 114/121 |
| 3,599,589 A * | 8/1971 | Busey | 114/264 |
| 3,680,320 A * | 8/1972 | Goodboy et al. | 405/303 |
| 3,680,515 A | 8/1972 | Yoneda et al. | |
| 3,791,080 A | 2/1974 | Sjoberg | |
| 3,895,495 A | 7/1975 | Akazaki et al. | |
| 4,047,390 A | 9/1977 | Boyce, II | |
| 4,186,532 A | 2/1980 | Kahn | |
| 4,195,628 A | 4/1980 | Lubitzsch et al. | |
| 4,299,066 A | 11/1981 | Thompson | |
| 4,565,149 A | 1/1986 | Clasky et al. | |
| 5,049,004 A | 9/1991 | Niimura | |
| 5,421,282 A * | 6/1995 | Morris | 114/264 |
| 6,073,573 A * | 6/2000 | Gruber | 114/264 |
| 6,325,012 B1 | 12/2001 | Aristizabal | |
| 6,327,994 B1 * | 12/2001 | Labrador | 114/382 |

FOREIGN PATENT DOCUMENTS

| | | | |
|---|---|---|---|
| JP | 61-175197 | * | 8/1986 |
| JP | 64-18797 | * | 1/1989 |

* cited by examiner

*Primary Examiner*—Sherman Basinger
(74) *Attorney, Agent, or Firm*—Michael I. Kroll

(57) ABSTRACT

A self-sufficient man-made island complex having a plurality of interconnected islands housing a theme resort simulating a tropical paradise in which the guests have a multitude of activities in which they interact and learn about nature and particularly marine life. Lodging and entertainment facilities are located both on the surface and underwater.

25 Claims, 33 Drawing Sheets

LOCATION AND DEFINITION CHART

| # | Description | # | Description |
|---|---|---|---|
| 22 | MAIN ISLAND | 284 | AQUARIUM — U1 WHALES / U2 DOLPHINS / U3 SHARKS |
| 30 | DOLPHIN SHAPED GUEST QUARTERS | 286 | PLANETARIUM |
| 50 | ABOVE WATER BUNGALOWS | 308 | 100 FOOT MOUNTAIN ACTIVITY ISLAND WITH INTERIOR RESTAURANT SEPARATE ISLAND |
| 64 | UNDER WATER ROOMS | | |
| 70 | UNDER WATER ESCALATORS/RAMPS | 310 | BOBSLED RIDE FROM ARCHED BRIDGE AT 85° ANGLE |
| 82 | GOLF TEE SHAPED GUEST QUARTERS | 336 | ARCHED BRIDGES WITH ANGELS |
| 110 | AIR STRIP | 342 | CHURCH (NONDENOMINATION) |
| 116 | SECURITY BUILDING (SUB-STATION) | 366 | RAIN FOREST |
| 120 | EMS-EMERGENCY FACILITY | 372 | WOLF HABITAT |
| 136 | DOCKING | 378 | WELCOME BUILDING TO MAIN ISLAND |
| 146 | MONORAIL | 380 | 24 HOUR BBQ |
| 164 | TURBO GENERATING POWER PLANT | 382 | CONSTANT RAINBOW |
| 174 | CHEMICAL WASTE DISPOSAL PLANT | 384 | FLOATING BOAT RENTAL FOR WATER FUN |
| 180 | DESALINIZATION PLANT | 386 | THEATER |
| 190 | FULL GOLF COURSE | 388 | GYM |
| 212 | FLOATING NIGHTCLUB | 390 | VOLLEY BALL COURT |
| 234 | CONFERENCE ROOM CONVENTION CENTER (UNDER WATER) INCLUDES OFFICES | 392 | BASKETBALL COURT |
| | | 394 | RACQUET BALL COURT |
| 238 | SOLAR PANELS | 396 | TENNIS COURT |
| 240 | WIND GENERATING POWER SOURCE | 398 | ICE HOCKEY AND SKATING RINK UNDERWATER |
| 242 | WAVE GENERATING POWER SOURCE | 400 | WAVE POOL |
| | | 402 | LAUNDRY FACILITIES |
| 246 | UNDER WATER SPA | 404 | SHOPPING FACILITIES |
| 248 | ABOVE WATER RESTAURANT | 406 | ISLAND WALK WAYS |
| 254 | UNDER WATER RESTAURANT | 408 | WORKERS QUARTERS |
| | | 410 | ATOLL |
| 258 | WATER PUMPING STATION | 412 | EXOTIC BIRD SANCTUARY |
| | | 414 | ATOLL RESTAURANT |
| 266 | POOL | 416 | ARTIFICIAL REEF FOR SURFING |
| 270 | WATER FALL | | |
| 272 | STREAM | 418 | HOTEL LOBBY DOME |

FIG. 3

OTHER GAMES AND ACTIVITIES AND FACILITIES ( not limited to ) INCLUDE;
(NOT SHOWN ON FIGURE 3)
* UNDERWATER ARCADE
  (SHAPED LIKE A STING RAY)
* PAINT BALL WAR (UNDERWATER)
* WHALE MAZE (UNDERWATER)
* MEDIEVAL GAUNTLET (UNDERWATER)
  ARCADE (POOL TABLES)
* WATER VOLLEYBALL (UNDERWATER)
* LASER DODGE (UNDERWATER)
* VIRTUAL REALITY GAMES (UNDERWATER)
* MINI BOWLING ALLEY (UNDERWATER)
* ANIMAL SPA
* WAVE POOL (UNDERWATER)
* ICE HOCKEY (UNDERWATER)
* RACQUET BALL
* UNDER WATER SPA (WITH ALL AMENITIES)
* GYM (ABOVE WATER) (SEE THROUGH JACUZZI)
* VOLLEYBALL COURTS
* BASKETBALL COURTS
* TENNIS
* SHOPPING (PRO SHOPS UNDERWATER/NOVALTY SHOPS ABOVE WATER)
* LAUNDRY FACILITIES
* MUCH MORE
* 100 FOOT ACTIVITY MOUNTAIN
PROVIDES SKI DIVING, BUNGEE JUMPING/SLING SHOT CANNON SHOT AND OTHER ACTIVITIES/ RESTAURANT
*UNDER WATER CONVENTION CENTER AND CONFERENCE ROOMS
*POOL TABLES
*CHURCH
*THEATER (UNDERWATER)
*PARASAILING
*FISHING (FOR MEALS ONLY)
*WHALE AND SHARK OCEAN AQUARIUMS
*SHARK OBSERVATION WITHIN IRON ENCLOSURES
*FLOATING RENTAL ISLAND WITH SNACK BAR, COLDCUTS, DRINKS
(NOT FULL RESTAURANT)
*PLANETARIUM - ABOVE WATER ON ISLAND
*SEPARATE ISLAND FOR SURF REEF WITH SNACK BAR
*SEE THROUGH WALK WAYS
*DIVING/ SCUBA CERTIFICATION
*24 HOUR EMERGENCY FACILITY FOR GUESTS
*24 HOUR EMEGENCY VETERINARY HOSPITAL
*24 HOUR CHILD CARE
*NOVELTY SHOPS.

FIG. 22

OTHER SERVICES, FACILITIES AND PROTOCOL ( not limited to ) INCLUDE;

* SHOPPING CENTER
* ANY KIND OF BANKING
* ANYTHING INDUSTRIAL
* ANYTHING COMMERCIAL
* ANYTHING HAVING TO DO WITH AN AMUSEMENT PARK
* ANYTHING RESIDENTIAL
* ANY OFFICE COMPLEX
* THEATERS
* GAS STATIONS
* ANY KNID OF FOOD SERVICES
* ANY KIND OF ANIMAL SANCTUARY OR WILDLIFE OR ANIMAL INHABITANTS
* SHOPPING MALLS OF ANY KIND
* CHEMICAL WASTE PLANT OF ANY KIND
* GOLF COURSE
* ANY KIND OF GOVERNMENT FACILITIES THAT MAY HAVE USE OF   SAID ISLAND WITHOUT PERMISSION GRANTED FROM THE RIGHTS    HOLDER OR AUTHORIZED BY THE GOVERNMENT ITSELF
* ANY KIND OF SECURITY
* ANY KIND OF COLLEGES, SCHOOLS AND EDUCATIONAL FACILITIES
* ANY KIND OF EXPERIMENTS WITH ANIMALS, PEOPLE OR OTHERS
* ANY KIND OF HOSPITAL FACILITIES
* SHOOTING RANGES
* TRAINING OF ANY KIND
* ANY KIND OF FISHING
* ANY AIRPORT
* NO HUNTING
* NOTHING INDUSTRIAL, COMMERCIAL, RETAIL OR INSTITUTIONAL    BUILT UNLESS GIVEN PERMISSION BY THE RIGHTS HOLDER OR    DONE BY GOVERNMENT AUTHORIZATION
* WHAT WAS SAID PREVIOUSLY STANDS FOR ANYTHING UNDER SAID ISLAND THAT IS BUILT, FLOATABLE OR RETRACTABLE BY USE OF ANCHORS OR STANCHIONS OR RETRACTABLE CABLES OF ANY KIND OR BY ANY OTHER MEANS

FIG. 33

MAN-MADE ISLAND RESORT COMPLEX WITH SURFACE AND UNDERWATER ENTERTAINMENT, EDUCATIONAL AND LODGING FACILITIES

BACKGROUND OF THE INVENTION

1. Field of the Invention

The present invention relates generally to underwater habitats and, more specifically, to a plurality of interconnected synthetic islands having an independent infrastructure utilizing natural resources in order to operate in an environmentally friendly manner. The present invention houses a marine based theme park in which people interact with the environment for fun and pleasure while learning about and developing respect for the beauty and fragile balance of the ecosystem.

2. Description of the Prior Art

There are other aquatic structures designed for human habitation. Typical of these is U.S. Pat. No. 739,961 issued on Sep. 29, 1903 to B. H. Weisker on Sep. 29, 1903.

Another patent was issued to S. Yoneda et al. on Aug. 1, 1972 as U.S. Pat. No. 3,680,515. Yet another U.S. Pat. No. 1,313,838 was issued to E. D. Stodder on Aug. 19, 1919 and still yet another was issued on Feb. 12, 1974 to J. B. Sjoberg as U.S. Pat. No. 3,791,080.

Another patent was issued to S. Akazaki et al. on Jul. 22, 1975 as U.S. Pat. No. 3,895,495. Yet another U.S. Pat. No. 4,047,390 was issued to W. D. Boyce on Sep. 13, 1977. Another was issued to Morris S. Kahn on Feb. 5, 1980 as U.S. Pat. No. 4,186,532 and still yet another was issued on Apr. 1, 1980 to W. Libitzsch et al. as U.S. Pat. No. 4,195,658.

Another patent was issued to V. P. Thompson on Nov. 10, 1981 as U.S. Pat. No. 4,299,066. Yet another U.S. Pat. No. 4,565,149 was issued to Clasky et al. on Jan. 21, 1986. Another was issued to M. Niimura on Sep. 17, 1991 as U.S. Pat. No. 5,049,004 and still yet another was issued on Dec. 4, 2001 to Aristizabal as U.S. Pat. No. 6,325,012.

U.S. Pat. No. 739,961

Inventor: B. H. Weisker

Issued: Sep. 29, 1903

A submarine building composed of water-tight submerged stories below the surface of the water, a number of stories above the surface of the water, and an intermediate or mezzanine story having openings for the entrance of the water, separating the lower submerged stories from the upper stories, substantially as set forth.

U.S. Pat. No. 1,313,838

Inventor: Edward D. Stoddard

Issued: Aug. 19, 1919

A submarine observatory comprising a caisson, a stairway in said caisson, observation windows below the water level, means for illuminating the water in the field of view from said windows, and an electrically operated pump, and a float for automatically actuating said pump.

U.S. Pat. No. 3,680,515

Inventor: Shoji Yoneda et al.

Issued: Aug. 1, 1972

An undersea observation gallery comprising an annular chamber having sight windows in the outer peripheral wall thereof and an independent combination ballast tank and pontoon connected to the top of said annular chamber and communicated with said annular chamber by a stairway, said annular chamber being submerged or surfaced when water is charged into or discharged from said combination ballast tank and pontoon.

U.S. Pat. No. 3,791,080

Inventor: John B. Sjoberg

Issued: Feb. 12, 1974

A floating or land based modular assembly for housing or commercial use including one or more selectively interengageable units. Each unit is of polygonal prefabricated shape and comprises complemental base or hull sections and a roof section which sections are spaced apart by supporting columns, the supporting columns being removed to permit collapsing of the unit. Means are provided for joining any desired number of modular units together, and for retaining the assembly in place on water or land.

U.S. Pat. No. 3,895,495

Inventor: Shigeru Akazaki et al.

Issued: Jul. 22, 1975

An observation vessel incapable of self-propulsion and anchored in the sea for observing underwater and seabottom ecology in a relaxed sightseeing atmosphere in an observation chamber of an undersea observation tower. The latter is mounted for vertical movement below the sea-level at the central portion of the vessel.

U.S. Pat. No. 4,047,390

Inventor: William D. Boyce, II

Issued: Sep. 13, 1977

Apparatus for isolating from a body of water a predetermined bottom area and a volume of water or other liquid extending above the bottom area up to the surface of the body of water, comprising a flexible wall member with a flexible and conforming base section formed on its lowermost edge. The base section is adapted to be filled selectively from the surface of the body of water to anchor the wall member to the bottom. A float member is secured to the uppermost section of the wall member to keep the wall member floating above the surface of the body of water.

U.S. Pat. No. 4,186,532

Inventor: Morris S. Kahn

Issued: Feb. 5, 1980

An off-shore underwater observatory comprising a lower, submerged observation gallery fitted with at least one observation window and having a ceiling with an opening through which the observation gallery is accessible, and a body of water on top of the gallery such that the combined weight of the structure and the water exceeds the buoyancy. An annular skirt may depend from the ceiling in extension of said opening to a level which is below the head level of a person standing in the gallery, the upper edge(s) of the window(s) not exceeding the lower edge of said skirt.

U.S. Pat. No. 4,195,628

Inventor: Wolfgang Lubitzsch et al.

Issued: Apr. 1, 1980

A deep sea diving circulation system for a diver at a diving depth from a station above the water level, comprises a closed respiratory gas delivery line from the station to the diver and a return line from the diver to the station. A $CO_2$ absorber is arranged in the delivery line above the water level along with means for sensing the value of the oxygen in the delivery line and for supplying a correct oxygen replacement. The respiratory gas is circulated by a compressor which is capable of producing the necessary pressure difference for the level of operation of the diver in respect to the surface. A bypass line is arranged to connect across the inlet and outlet to the compressor and the flow cross-section therethrough is controlled by the pressure in the line circulating system. Cylinders with pressurized breathing gas are connected into the circulating line system before the diver's helmet through a pressure reducer having an after pressure lower than the pressure in the line system before the diver's helmet. The carbon dioxide control device is arranged in a bypass line in the system located above the water surface and so is an oxygen control device. A pressure reducer is arranged in the circulating line system and it is actuated by the diving depth pressure.

U.S. Pat. No. 4,299,066

Inventor: Virley P. Thompson

Issued: Nov. 10, 1981

A dome structure having a plurality of isolatable and preferably environmentally isolatable and inhabitable compartments. These inhabitable compartments are preferably capable of generating an environmental condition capable of supporting animal life and preferably human life. The dome structure comprises a first upper dome section and a first lower dome section which form a first environmentally isolated dome chamber therebetween. The apparatus includes a second upper dome section having a peripheral size smaller than the first upper dome section. A second lower dome section has a peripheral size smaller than the first lower dome section and is capable of being attached to the second upper dome section to form a second environmentally isolated dome chamber. This second isolated dome chamber is surrounded by and environmentally isolated from the aforesaid peripheral portions of the first and second upper dome sections and peripheral portions of the first and second lower dome sections to thereby ensure the isolation in the first and second dome chambers. In a particular preferred embodiment, each of the first and second dome chambers are of a size to be occupied by human beings. The structure includes means to generate its own source of power such as electrical power.

U.S. Pat. No. 4,565,149

Inventor: Richard Clasky et al.

Issued: Jan. 21, 1986

A semi-submergible spherical residential structure adapted to be floated in a body of water. The structure features a substantially spherical shell having a hollow annular sponson affixed around its maximum girth such that the sponson is parallel to the water surface when the structure is floating in a body of water. The outer diameter of the sponson is sufficiently large so as to stabilize the shell when floating and the sponson has a width which is sufficiently great so as to provide adequate reserve buoyancy to the structure when the latter is weighted.

U.S. Pat. No. 4,049,004

Inventor: Masateru Niimura

Issued: Issued Sep. 17, 1991

An underwater building comprises a floating base that is to be fixed to a bottom under water or the sea and a building body is constructed on the base. The base floats on the water surface before construction of the body of the building, and the building body formed thereon has a double-walled construction having an opening between an outside wall and an inside wall. Water is selectively poured into and drained from the opening, and by its weight the building body is controllably sunk into the water. Only a gateway tower portion made in the upper portion of the building body is eventually left projecting out of the water.

U.S. Pat. No. 6,325,012

Inventor: Luis Alberto Aristizabal

Issued: Dec. 4, 2001

A complete design for a submergible cabin is submitted, which provides commodities and standards required for housing 8 people with absolute commodity and safety under the water for an indefinite period of time. The infrastructure for life support is located at the coast and the supplies are driven through pipelines anchored to the sea bottom. The level of water in the lower access, which works under the upside down cup principle, is controlled by redundant level sensors, which in turn allow access of fresh air to the cabin, sending to the coast part of the used air in order to not recycle the same air and evacuate bad smell, $CO_2$ and heat from air conditioner and refrigerator units. The design of the shells and the structure allows its transportation in standard containers and then assembly at the dock, close to the installation place. The total construction from ceiling to floor is carried out with only 3 small forms due to the design is done with repeating pieces in order to reduce costs. While these aquatic habitats may be suitable for the purposes for which they were designed, they would not be as suitable for the purposes of the present invention, as hereinafter described.

SUMMARY OF THE PRESENT INVENTION

A primary object of the present invention is to provide an environmentally friendly nature-based theme park on a plurality of synthetic islands.

Another object of the present invention is to provide a man-made island resort complex that has a plethora of activities and exhibits that are both surface based and underwater.

Yet another object of the present invention is to provide a man-made island resort complex having a plethora of activities and exhibits that are educational and fun.

Still yet another object of the present invention is to provide a man-made island resort complex that is operated entirely using natural resources.

Another object of the present invention is to provide a man-made island resort complex that may be transported to other locations.

Yet another object of the present invention is to provide a man-made island resort complex that is handicap and pet friendly.

Another object of the present invention is to provide a man-made island resort complex that is simple and easy to use.

Still yet another object of the present invention is to provide a man-made island resort complex that is inexpensive to manufacture and operate.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 3 is a location and definition of the present invention;

FIG. 22 is a chart of other activities of the present invention;

FIG. 33 is a chart of other provided services, facilities and protocol.

DESCRIPTION OF THE REFERENCED NUMERALS

Figure 1:
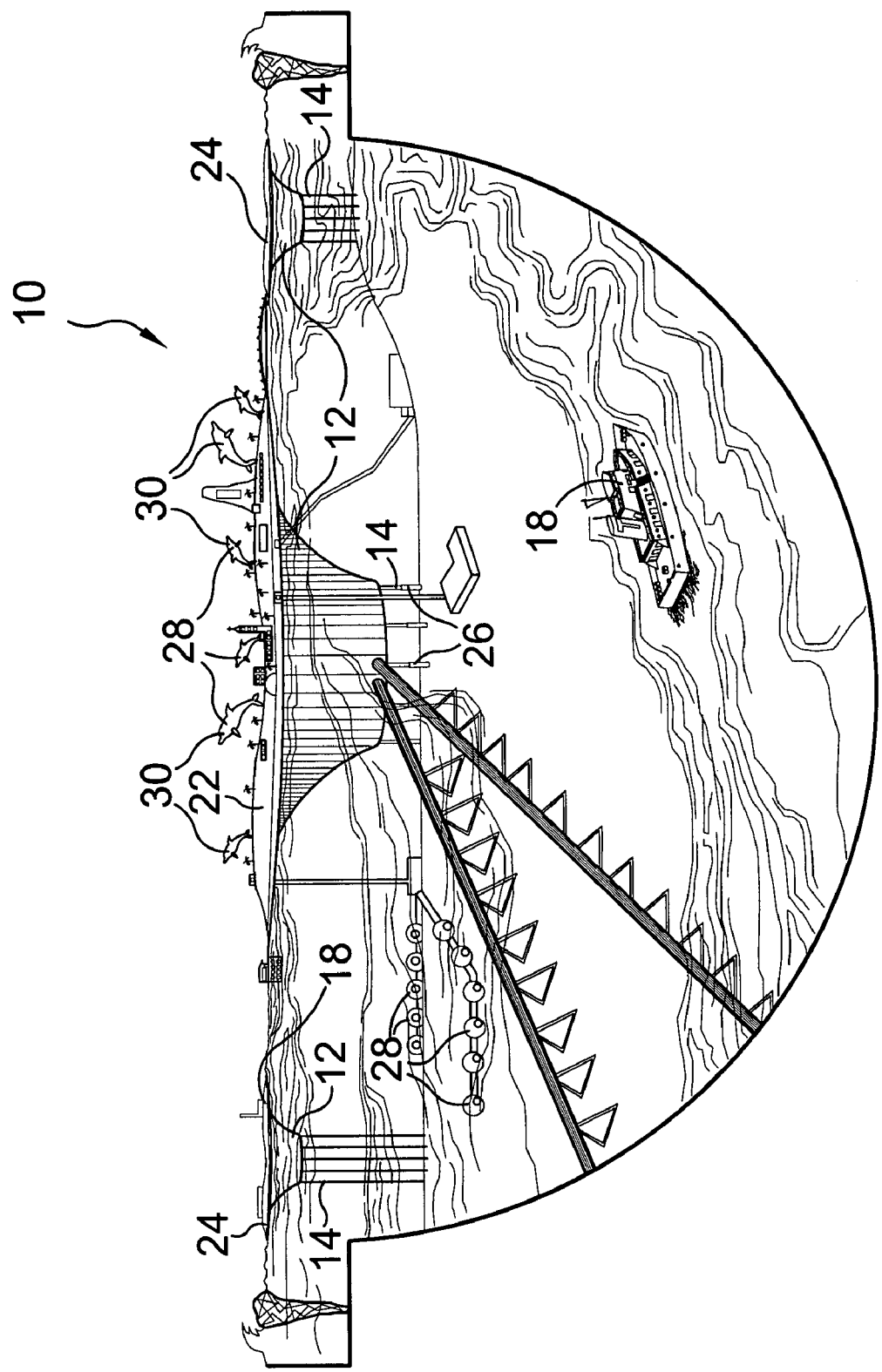
FIG. 1 is an illustrative view of the present invention.

Turning now descriptively to the drawings, in which similar reference characters denote similar elements throughout the several views, the figures illustrate man-made island resort complex with entertainment, educational and lodging facilities of the present invention. With regard to the reference numerals used, the following numbering is used throughout the various drawing figures.

10 man-made island resort complex
12 buoyant base support structure
14 anchoring means
16 facilities
18 transportation means
20 aero-gel material
22 main island
24 satellite island
26 retractable anchor pedestals
28 guest lodging facilities
30 dolphin-shaped hotel
32 lobby of 13
34 guest room of 30
36 penthouse of 30

38 water tube of 30
40 sub and water pump of 30
42 retractable ceiling of 36
44 exterior blue light of 30
46 elevator of 30
48 entrance to 32
43 spiral ramp
50 cave-shaped bungalow
52 dome structure of 50
54 interior waterfall and basin of 50
56 hot and cold water temperature control switches
58 salt/fresh water changing means
60 toilet area with hot water
62 boardwalk
64 underwater guest rooms
66 exterior bulletproof glass
68 room access port
70 enclosed escalator tube
72 fresh air and ventilation port
74 emergency oxygen tanks
76 door to room
78 door to tube
80 surface-based lobby
82 tri-level guest unit
84 bulletproof sphere
86 first floor living area
88 second floor children's room
90 third floor swimming pool
92 master bedroom
94 water slide
96 waterfall
98 water feed cylinder
100 light source for 98
102 luminescent control switch
104 wet bar of 82
106 children's bar of 88
108 hydraulic retractable ceiling
110 airport
112 runway
114 air traffic control tower of 110
116 airport security, fire and rescue headquarters
118 flight office of 112
120 emergency medical services facility of 110
122 emergency vehicle hangar of 110
124 marina of 110
126 nautical plans facility of 110
128 visitor comfort station of 110
130 flight office of 110
132 helipad
134 landing lights
136 marina island
138 support and service facility of 136
140 small boat portage of 136
142 large boat slip of 136
144 ocean liner slip of 136
146 monorail system
148 sub-surface transport tube of 146
150 concrete stanchions of 146
152 monorail track of 148
154 passenger transport center of 146
156 monorail train of 146
158 passenger compartment of 156
160 drivers compartment of 156
162 bulletproof window of 156
164 turbo-generated power facility
168 turbo-generator of 164
170 water outtake line of 164
172 power distribution line of 164
174 chemical waste and disposal plant
176 power source from turbo-generated power plant
177 waste inlet from facilities
178 treated waste outlet to disposal tank
180 desalinization plant
182 purification system of 180
184 seawater intake conduit of 180
186 outtake conduit of 180
188 fresh water distribution means of 180
189 flow switch of 188
190 18-hole golf course
192 arched access footbridge of 190
194 dolphin waterfall of 192
196 golf ball and tee shaped structure of 190
198 ocean water trap of 190
200 ocean water trap with underwater ball catch of 190
202 restaurants of 196
204 clubhouse of 196
206 underwater pro shop of 196
208 underwater ball catch of 200
210 irrigation holes of 200
212 floating nightclub
214 arched footbridge of 212
216 security check of 212
218 interior waterfalls of 212
220 royal blue lights of 212
222 see-through hunter green stage of 212
224 see-through dance floor of 212
226 see-through tables of 212
228 safety net of 212
230 bar area of 212
232 spiral ramp of 30
234 conference center
236 security building
238 solar panels
240 wind powered generation source
242 wave powered generation source
244 concrete stanchion of 110
246 underwater spa
248 above water restaurant
250 safety net of 248
252 arched access bridge of 248
254 see-through underwater restaurant
256 multi-tiered waterfall
258 water pumping station
260 see-through stream to ocean
262 water filtration system of 260
264 arched footbridge over 260
266 swimming pool with see-through bottom
268 first waterfall of 266
270 second waterfall of 266
272 stream of 266
274 bathers island with tree phone of 266
276 restaurant of 266
278 wading bar of 266
280 tiki bar of 266
282 eating area in pool
284 open ocean aquarium
286 planetarium
288 open ocean whale habitat
290 open ocean shark habitat
292 compressed air cannon
294 cannon of 292
296 compressed air chamber of 292
298 air compressor of 292
300 plastic tube of 292

302 in-line pressure valve of 292
304 generator of 292
306 positioning means of 292
308 activity mountain
310 bobsled run
311 safety net
312 skateboard and BMX bike concrete wave rider
314 skydiving pad
316 bungee jumping pad
318 restaurant
320 rock tables
322 waterfall of 308
324 hot air balloon ride
326 cannon bolt sling shot ride
328 slingshot ride
330 elevator
332 ocean water distribution means
334 desalinated water distribution means
336 arched bridge of 308
336 red lights for mountain
338 white lights for 336
340 blue lights for 310
342 church
344 royal blue robe
346 gold trim
348 metallic gold doors
350 white light
352 steps
354 ramp
356 handrail
357 stingray arcade
358 octopus restaurant
360 telephone kiosk
362 voice activated telephone
364 surround sound speaker system
366 simulated rain forest
368 live exotic animals
370 guests
372 wolf habitat
374 wolf
378 welcome building to main island
380 24 hour BBQ
382 constant rainbow
384 floating boat rental
386 theater
388 state of the art gym
390 volleyball court
392 basketball court
394 racquetball court
396 tennis court
398 ice skating rink
400 wave pool
402 laundry facilities
404 shopping facilities
406 see through island walkways
408 workers quarters
410 atoll
412 exotic bird sanctuary
414 atoll restaurant
416 artificial reef
418 hotel lobby dome
420 pool tables
422 paint ball war
424 whale maze
426 medieval gauntlet
428 water volleyball
430 laser dodge
432 virtual reality games
434 mini bowling alley
436 animal spa with 24 hour boarding
438 wave pool
440 scuba diving

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to the appended claims.

FIG. 1 is an illustrative view of the present invention 10. The present invention 10 is a man made island complex providing a plurality of facilities 16 including under water guest quarters 64, an under water monorail 146, under water spa 246, an under water restaurant 254, open ocean marine life wonders and a plurality of above water facilities which may be located off of the main island 22 and accessed by an arched bridge 336 with angel figurines acting as waterfalls. Also including six dolphin shaped hotels 30 with penthouses 36, bungalows 50, a waterfall 268 that leads to a pool 266, game courts, a church 342, a planetarium 286, restaurants 248, 254, 276, 358, a 24 hour BBQ 380, state of the art gym 388, full golf course 110, an airport 110 and much more. All islands and facilities are handicap and animal friendly. Emergency back up power and other safety features are also provided throughout the resort.

Figure 2:
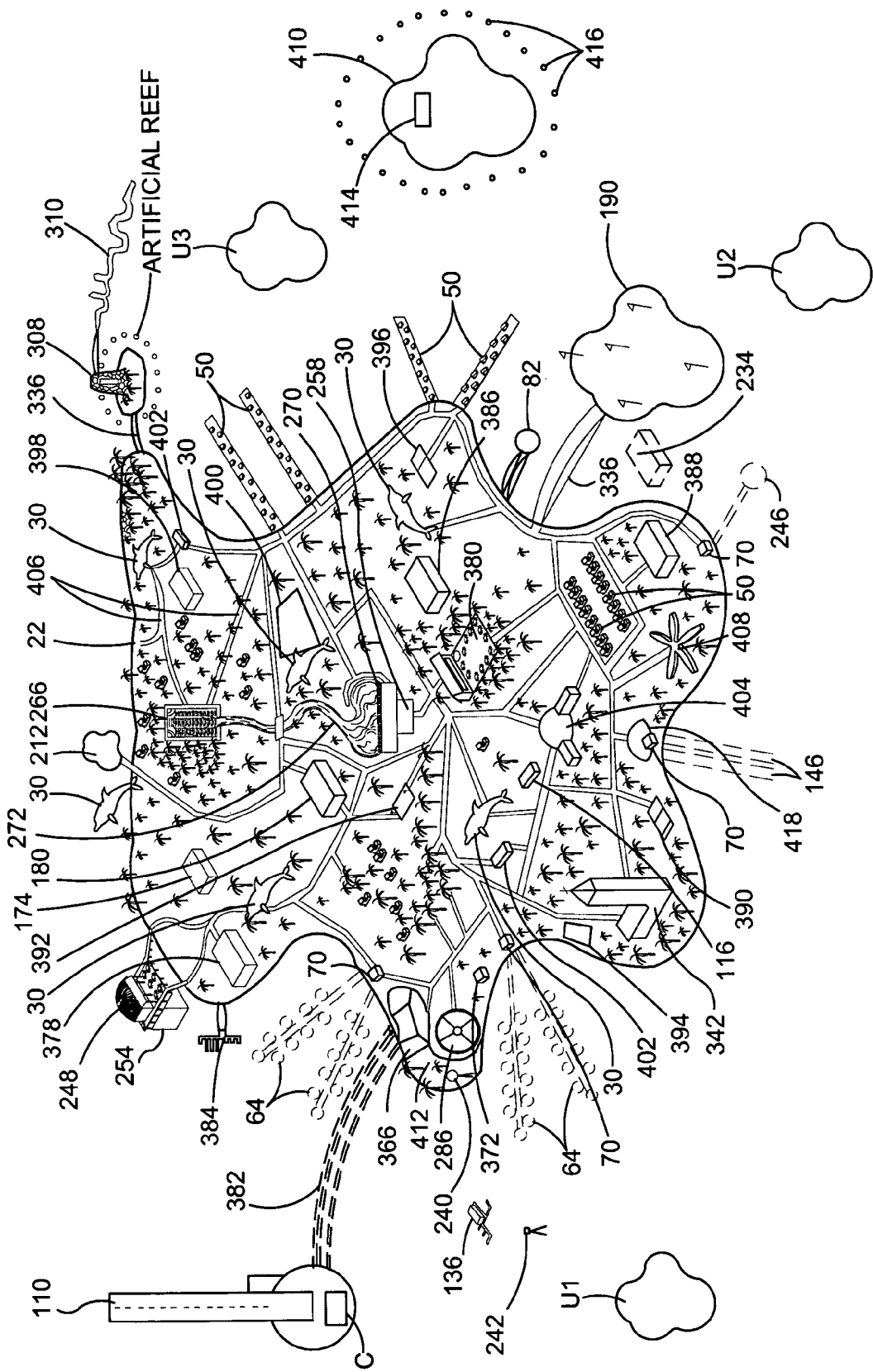
FIG. 2 is a top view of the present invention.

FIG. 2 is a top view of the present invention 10. Shown is a top view of the present invention 10, a man-made floating island complex with above and below water facilities 10 having a constant rainbow 382 serving a dual purpose, one for safety and the other for aesthetic purposes. Each facility shown corresponds with a reference numeral that is defined within the chart on FIG. 3.

FIG. 3 is a location and definition chart of the present invention 10 for use with FIG. 2.

Figure 4:
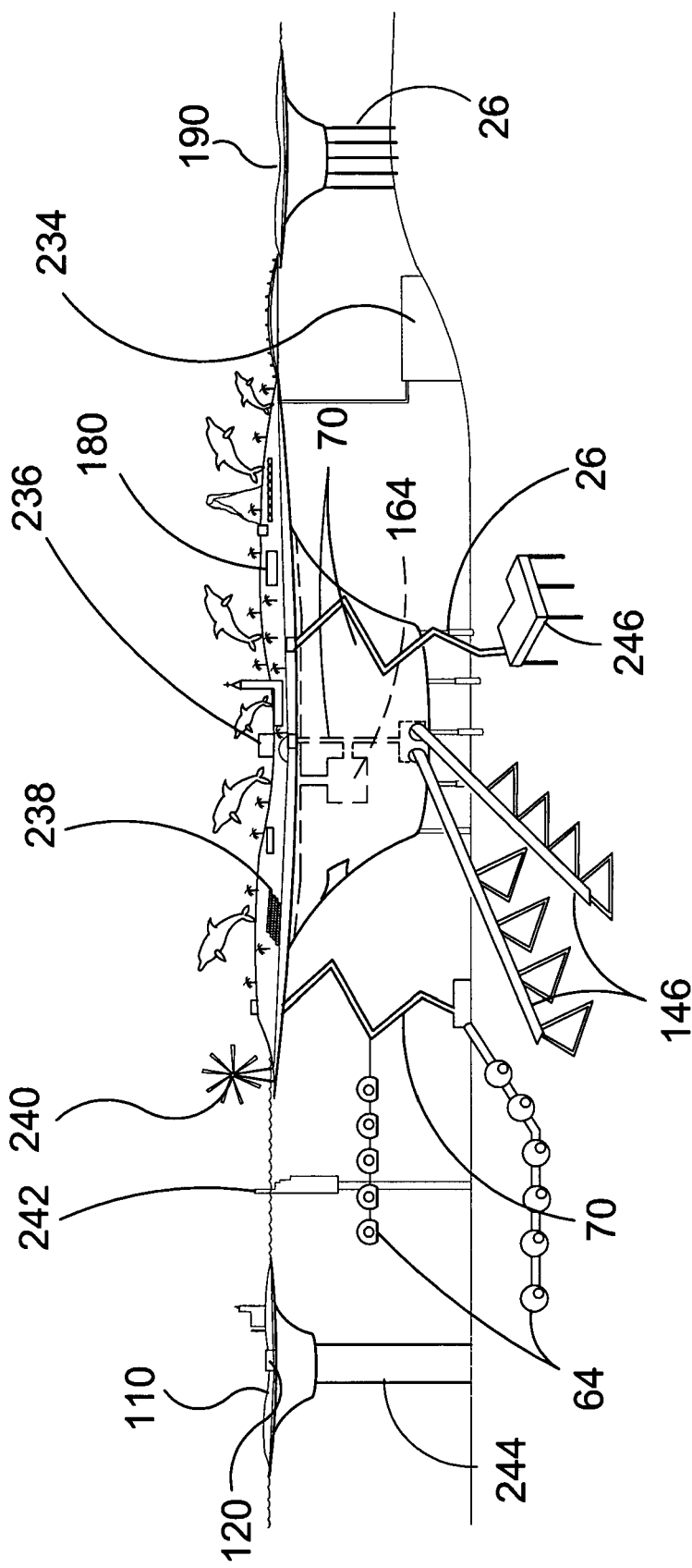
FIG. 4 is a side view of the present invention.

FIG. 4 is a side view of the present invention 10. Shown is a side view of the present invention 10 having a main artificial island 22 constructed from an aero-gel material 20 providing a floatable structure 12 supported by concrete stanchions 152 and anchored by means of retractable anchor pedestals 26 that extend and retract with the sea water tides. The island complex 10 comprises self-generating power by means of solar 238, wave generated 242, wind generated 240 and turbo-generating 164 electricity. Other sources may also be provided. Other facilities are provided such as a desalinization plant 180 to remove salts and other chemicals from sea water and supplied to all facilities 16 on the complex 10. A chemical waste disposal plant 174 is also provided. Satellite islands 24 provide facilities 16 for guests 370, including emergency service 120, transportation 18 and activities such as golf 190, an atoll 410 having a restaurant 414 and artificial reef 416 for surfing, open ocean marine life and others. All facilities 16 are handicap and animal friendly and provide ramps and elevators in case of emergency.

Figure 5:
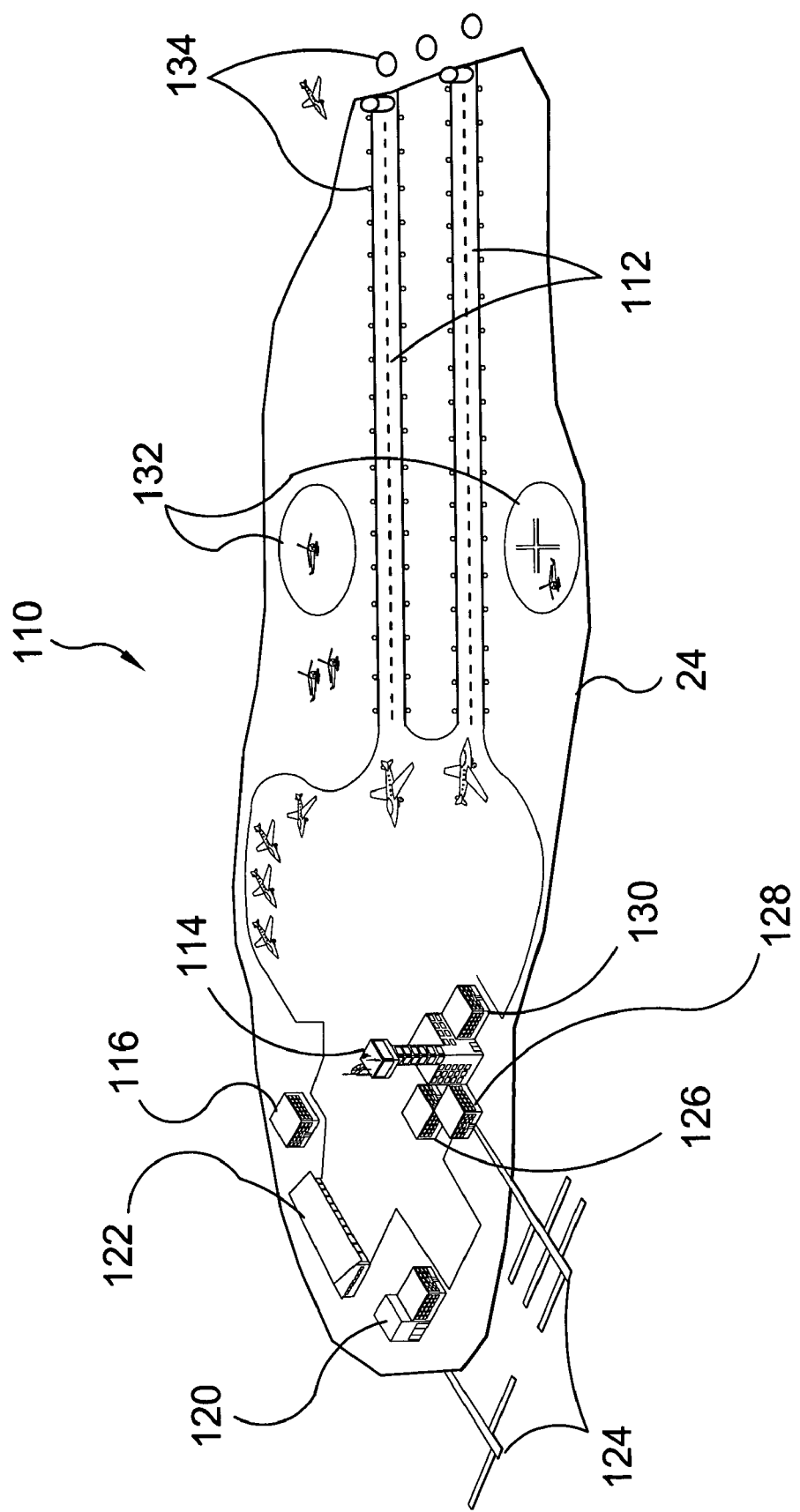
FIG. 5 is an illustrative view of the airport island of the present invention.

FIG. 5 is an illustrative view of the airport island 110 of the present invention 10. A separate aero-gel airport island 110, supported by concrete stanchions 150 and elevated 12 feet above tidal surge is provided for linking the passenger flow to and from the main island 22. The airport 110 is designed to receive small passenger planes, courier planes and helicopters and provides facilities for both. The state of the art airport 110 also provides airport security 116 and fire and rescue facilities 116. The emergency (EMS) facility 120 is also located on the airport island 110. Other facilities are provided for the visiting masses. No vehicle may land or dock without prior notice to the appropriate authorities for safety reasons. This also includes our own helicopters for EMS services and tourist rides.

Figure 6:
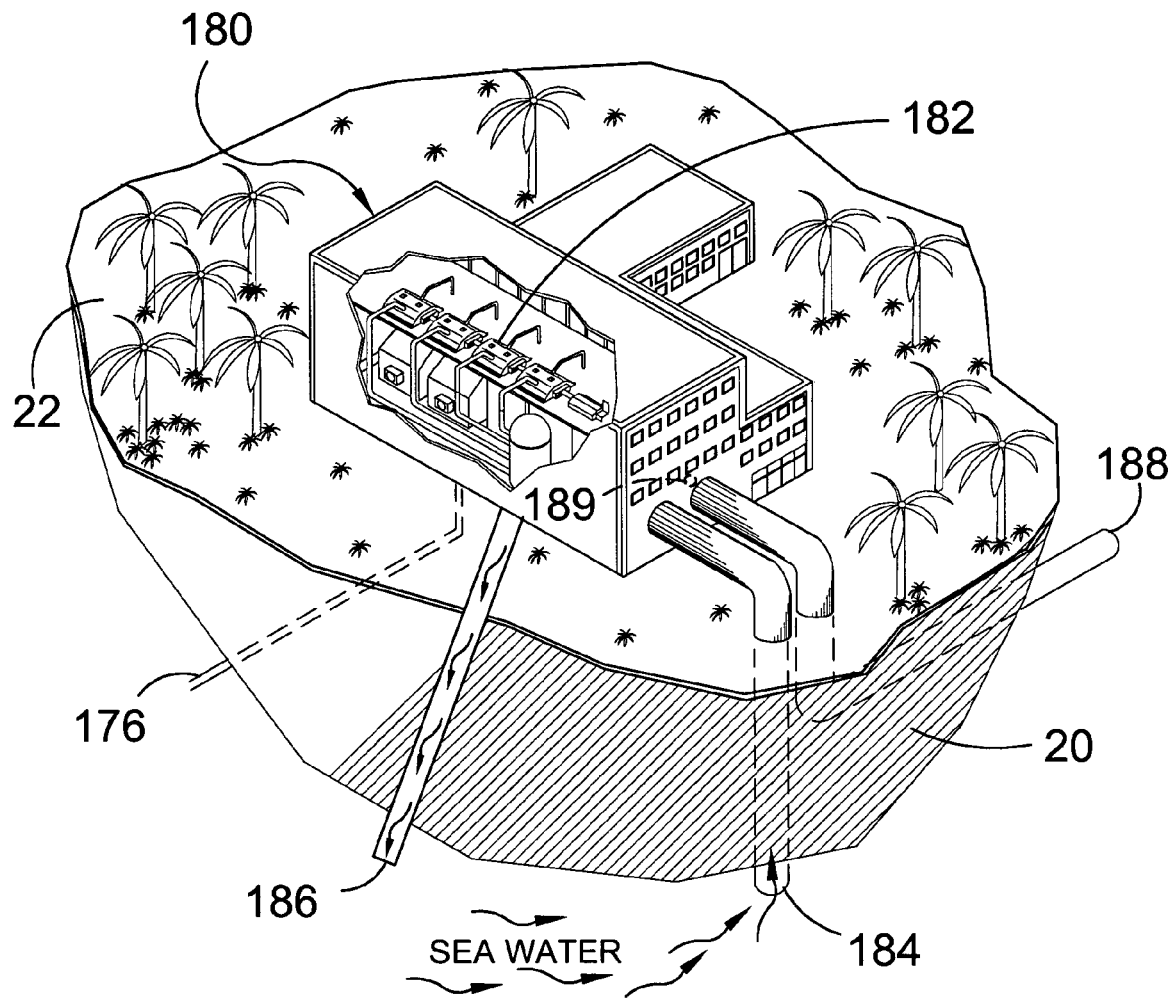
FIG. 6 is an illustrative view of the desalinization plant of the present invention.

FIG. 6 is an illustrative view of the desalinization plant 180 of the present invention 10. The desalinization plant 180 provides the complex facilities 16 with fresh water and uses converted seawater as its source. The plant 180 and process removes salts and other chemicals from seawater, converting the water to fresh useful H2O. The use between hot or cold water is up to the user and can change from one to the other by means of a switch. A desalinization plant 180 is located on each island and includes flow switch 189.

Figure 7:
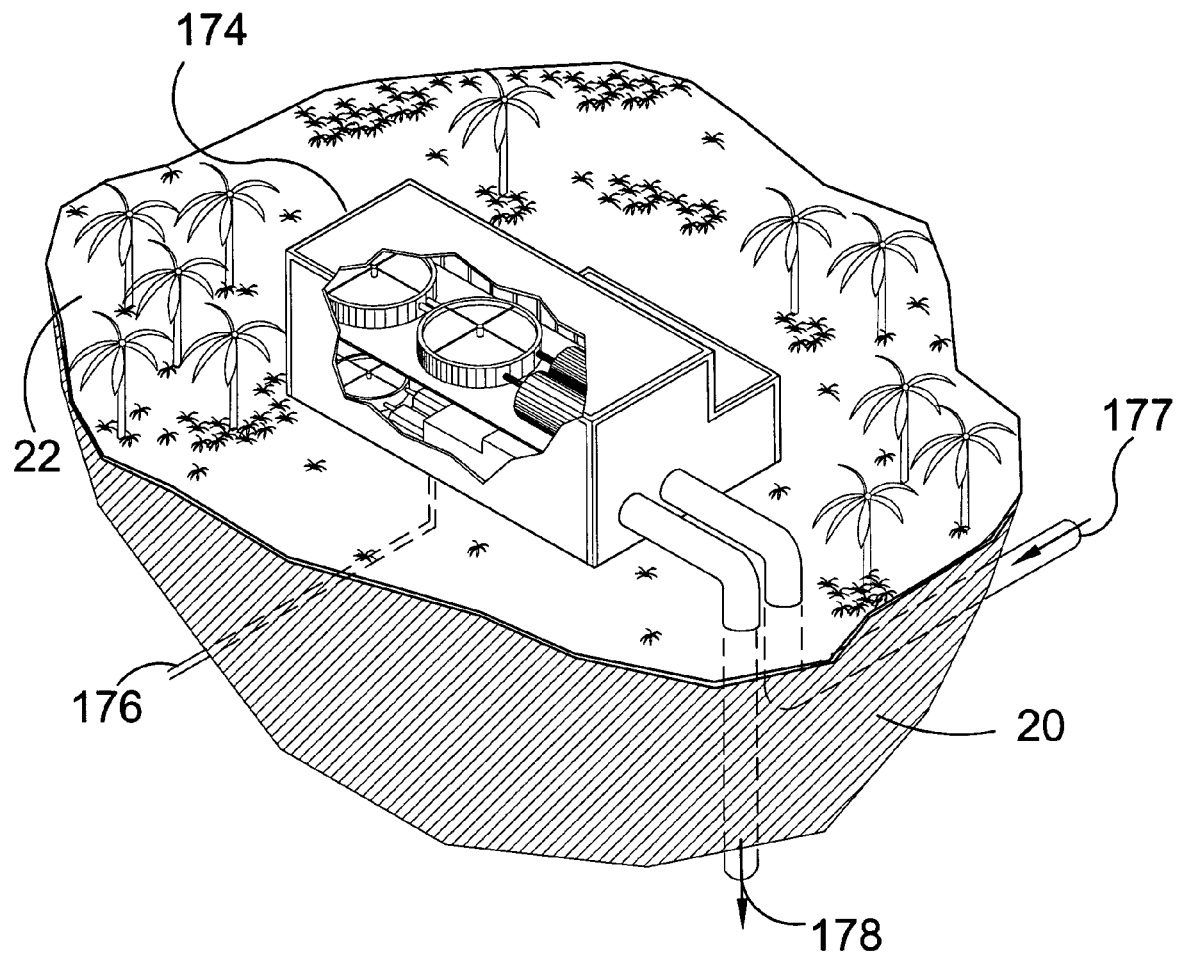
FIG. 7 is an illustrative view of the chemical waste and disposal plant of the present invention.

FIG. 7 is an illustrative view of the chemical waste and disposal plant 174 of the present invention 10. The chemical waste and disposal plant 174 receives and treats all waste materials from the islands facilities 16 and dispenses the treated material to a disposal tank to be disposed of properly. A plant 174 is located on each of the islands. Every island has bathroom facilities.

Figure 8:
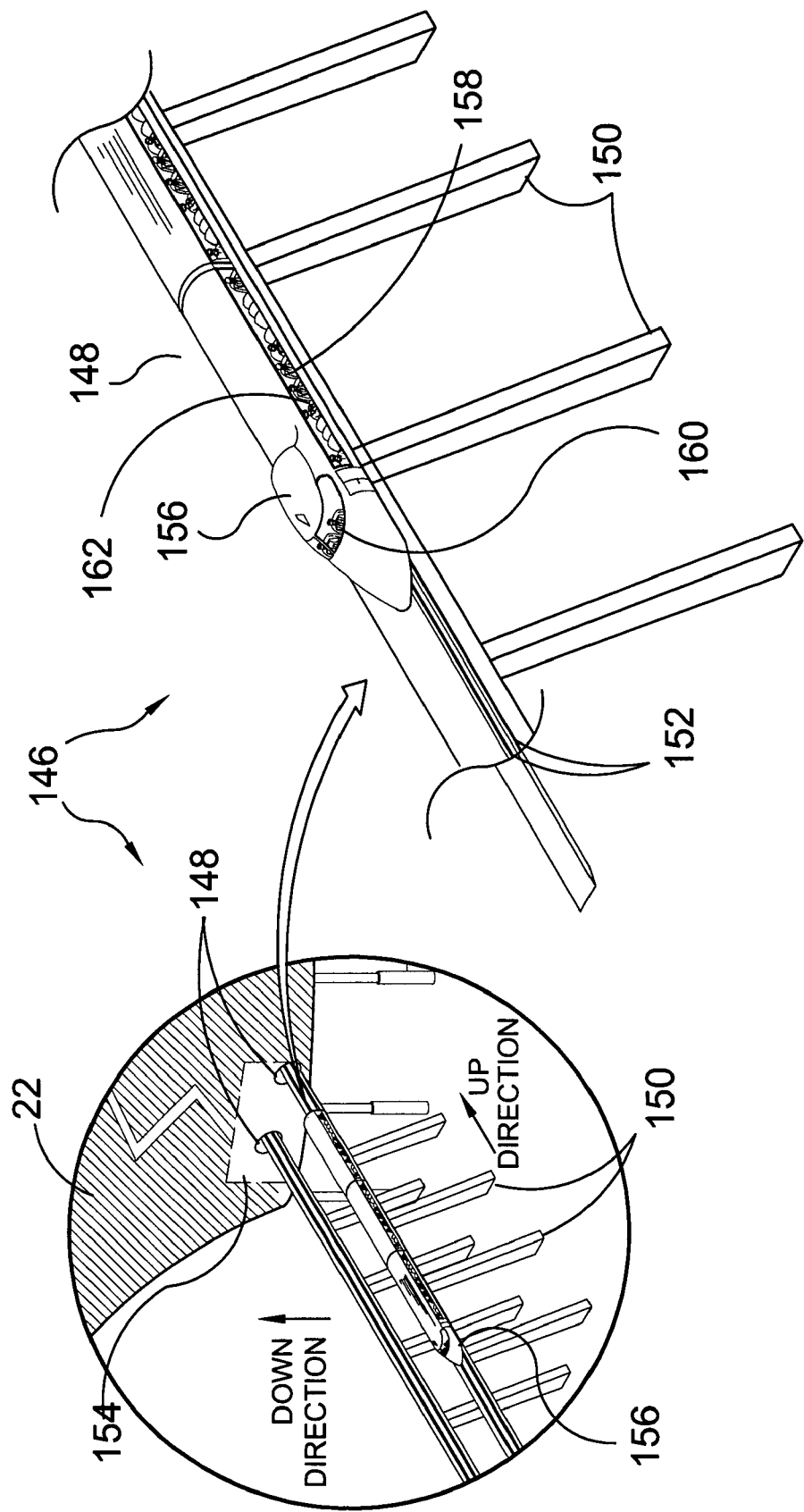
FIG. 8 is an illustrative view of the monorail system of the present invention.

FIG. 8 is an illustrative view of the monorail system 146 of the present invention 10. The monorail system 146 provides a form of transportation to and from the mainland and the main island 22. It is a subsurface system and is accessed from a ramp upon the island. The monorail 156 moves in an upward direction to the mainland. At the distal end of the monorail track 152 (mainland), an exit ramp is provided for loading and unloading. The driver can stop the monorail 156 or send an alert message to the main security building 116. Oxygen drops down for all passenger seats. Also, people or guests do not have access to the drivers.

Figure 9:
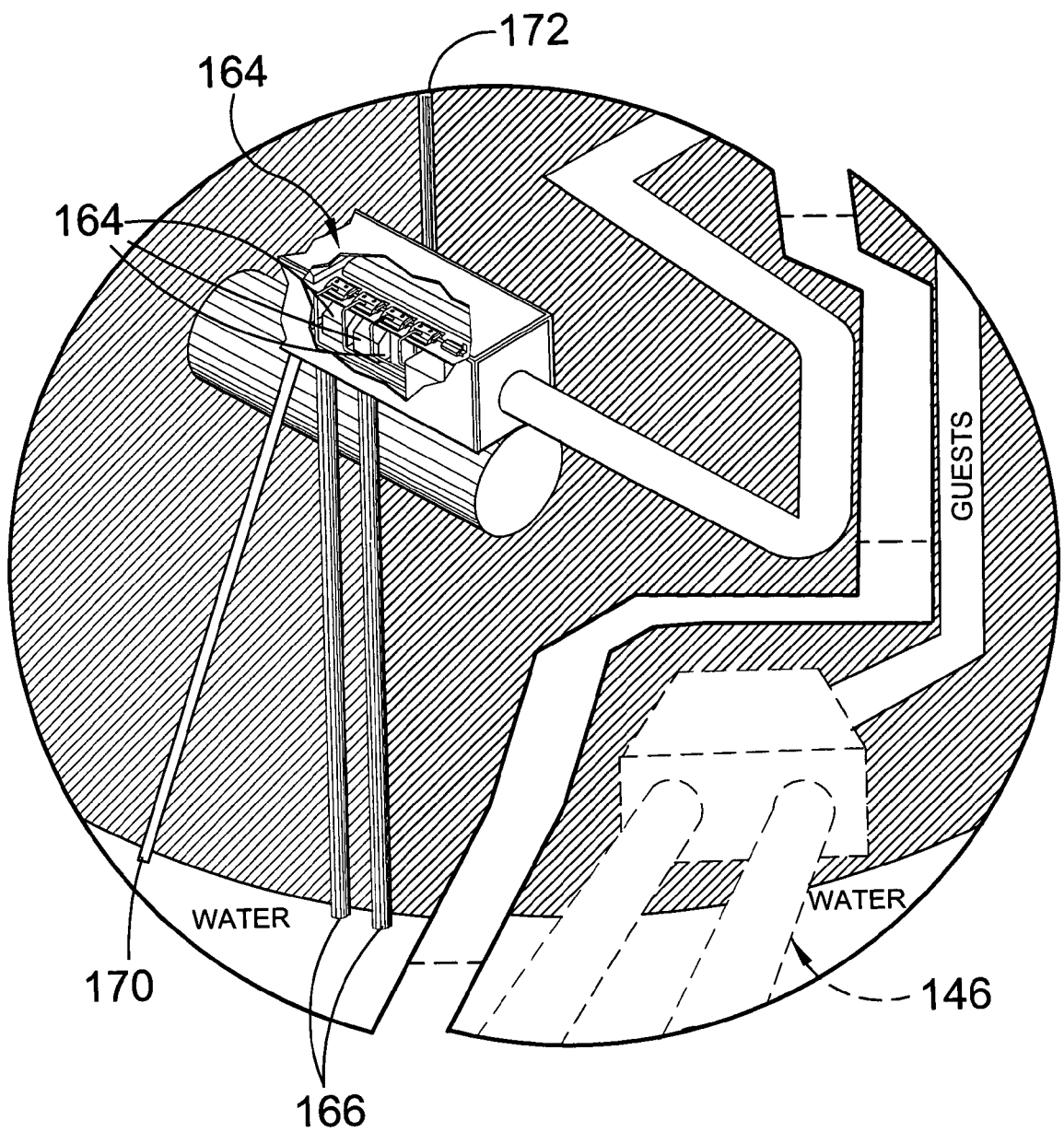
FIG. 9 is an illustrative view of the turbo generator power facility of the present invention.

FIG. 9 is an illustrative view of the turbo generator power facility 164 of the present invention 10. The turbo-generators 168 provide the island complex 10 with its main source of electricity and is located within the core of the main islands 22 structure. The ramp is an escalator if there are no power outages.

Figure 10:
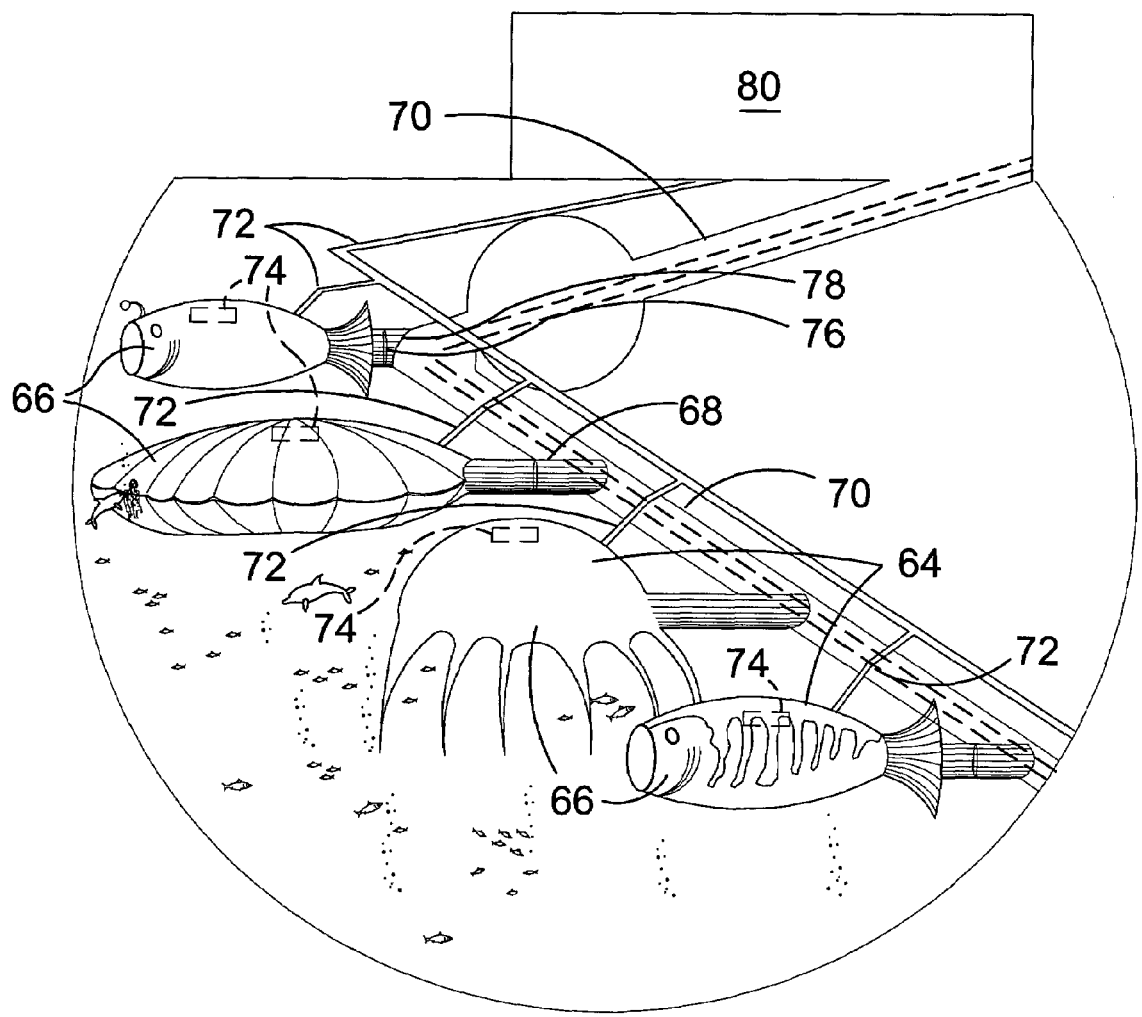
FIG. 10 is an illustrative view of the underwater rooms of the present invention.

FIG. 10 is an illustrative view of underwater guest rooms 64 of the present invention 10. The underwater rooms 64 (20 to a string) are accessed by an escalator 70 which turns into a ramp in case of a power failure. Each underwater guest room 64 has its own entrance 76 and a second door 78 in the case of flooding and provides a panoramic view of the underwater world. Each underwater guest room 64 is constructed of bulletproof glass. Exotic gardens surround each unit, providing an added attraction to fish and human observers. Each unit is provided with emergency air tanks 74 and has two doors 76, 78 providing access, in case of decompression or flooding that may head to other rooms also, each room is self-ventilated with ocean air via lobby by a fresh air and ventilation port 72. Each underwater guest room 64 provides a different theme.

Figure 11:
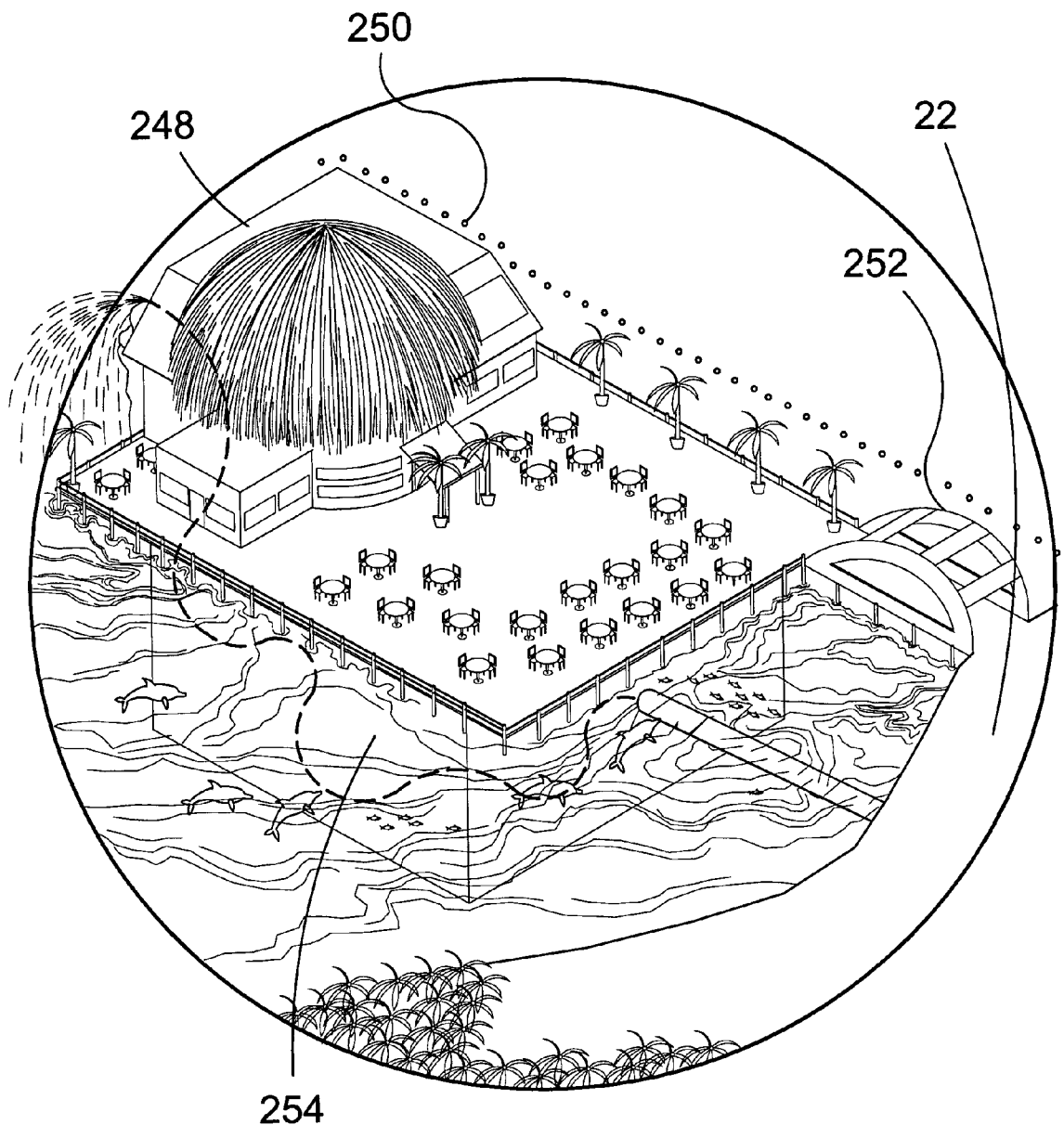
FIG. 11 is an illustrative view of the above and underwater restaurants of the present invention.

FIG. 11 is an illustrative view of the above water restaurant 248 and underwater restaurant 254 of the present invention 10. The above water restaurant 248 is see through and is located off the main island 22 and is accessed by an arched footbridge 252. The shape of said island may itself be island shaped. The under water restaurant is located below the above restaurant and is accessed the same way. The above water restaurant 248 provides an island type setting as where the under water restaurant 254 provides a maritime setting. An ocean pipe runs through both levels and cascades as a waterfall from the upper level of the above water restaurant 248, a back up pump system can assist in its effort.

Figure 12:
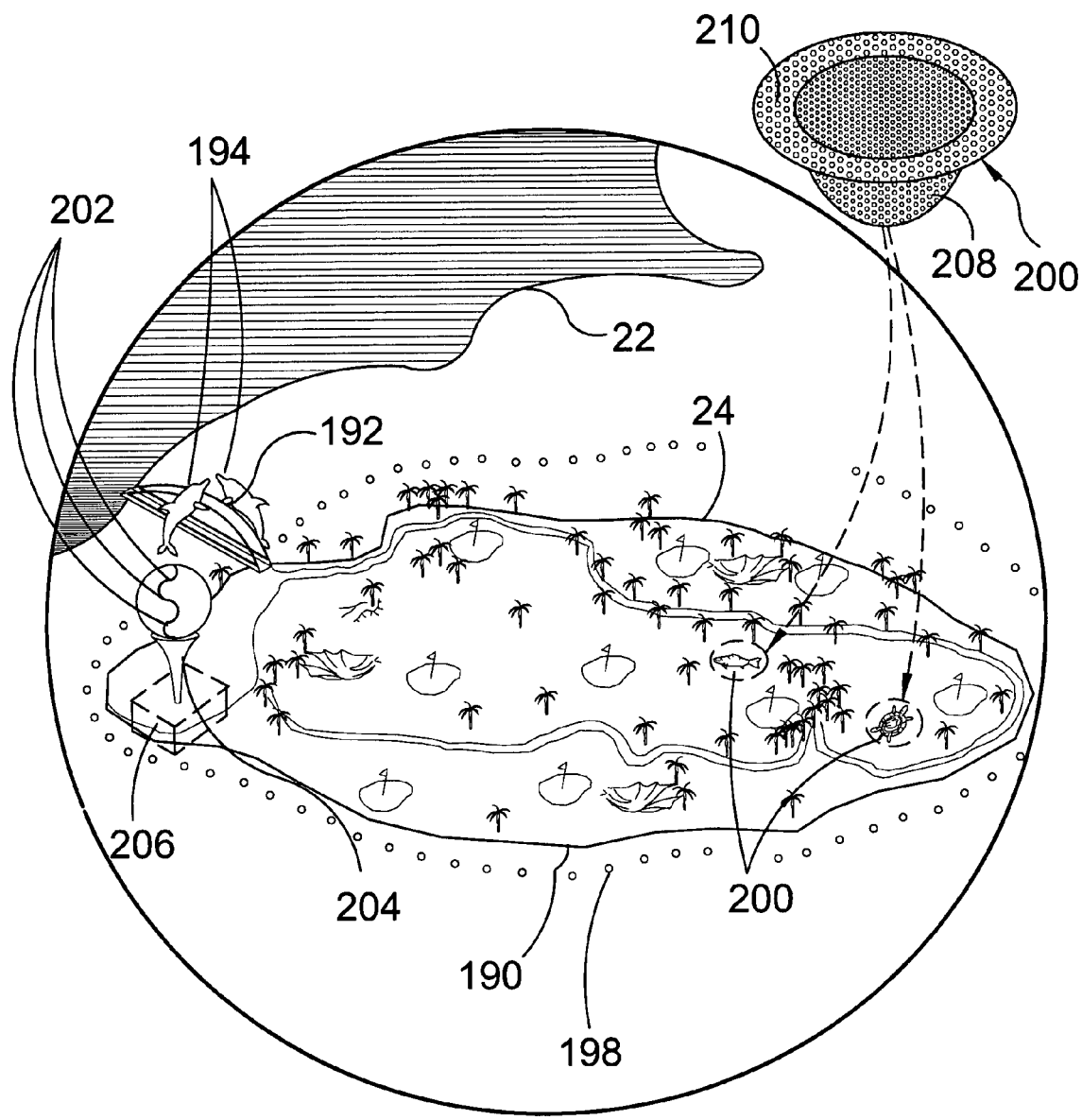
FIG. 12 is an illustrative view of the golf course island of the present invention.

FIG. 12 is an illustrative view of the golf course island 190 of the present invention 10. The golf course 190 is an 18-hole course and is accessible by an arched bridge 192 from the main island 22 to the golf course island 190. The arched bridge 192 comprises two dolphin waterfalls 194 that cascade thereover. A clubhouse 204 in the shape of a tee provides eateries 202 and underwater pro shops 206. An ocean water trap with under water ball catch 200 is comprised of hard plastic with fine holes 210 on the outer portion and inside allows grass to grow through on the edges and allows oxygen through water area keeping it clean. The net 198 around the golf course island 190 is designed to be above water but partially in so that fish do not become trapped within the device. All golf balls are collected as not to pollute the ocean waters. Grass grows through irrigation holes 210 allowing underwater ball catch 200 to stay in place.

Figure 13:
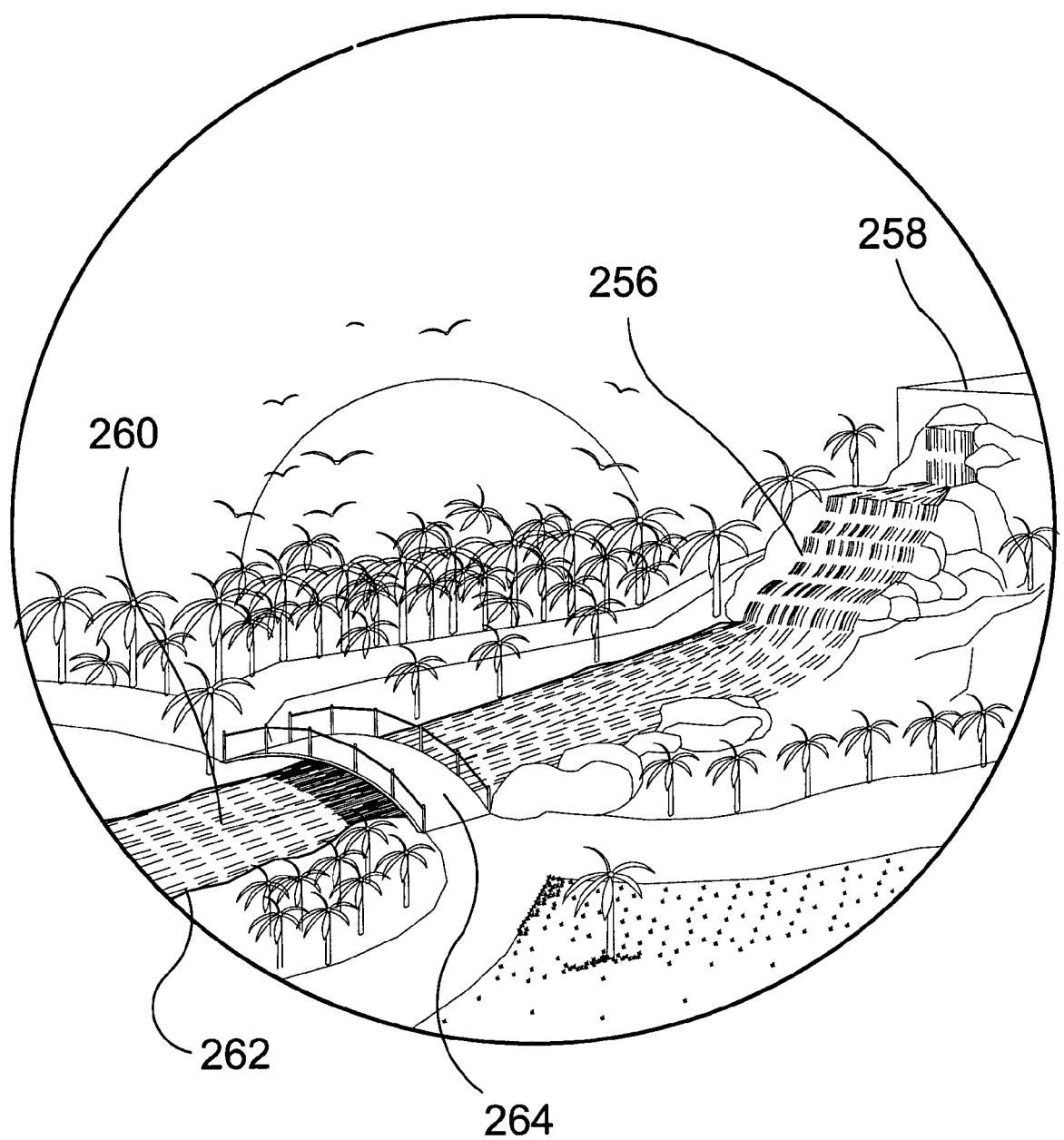
FIG. 13 is an illustrative view of the waterfalls and stream of the present invention.

FIG. 13 is an illustrative view of the waterfalls and stream 260 of the present invention 10. The multi-tier waterfall 256 of the stream 260 provides a plurality of tiers that cascade into a see through stream 260 to the ocean. The water used is pumped up from the sea and fed into the waterfall 256 and filtered 262 through special rocks that collect micro fibers as it is reused. The stream 260 meanders approximately ½ block from the falls 256 to the pool 266. There is no need for chlorine due to constant water flow. The sun, polymeric structure and the flowing of the water warms up the water prior to reaching the final destination, the pool 266.

Figure 14:
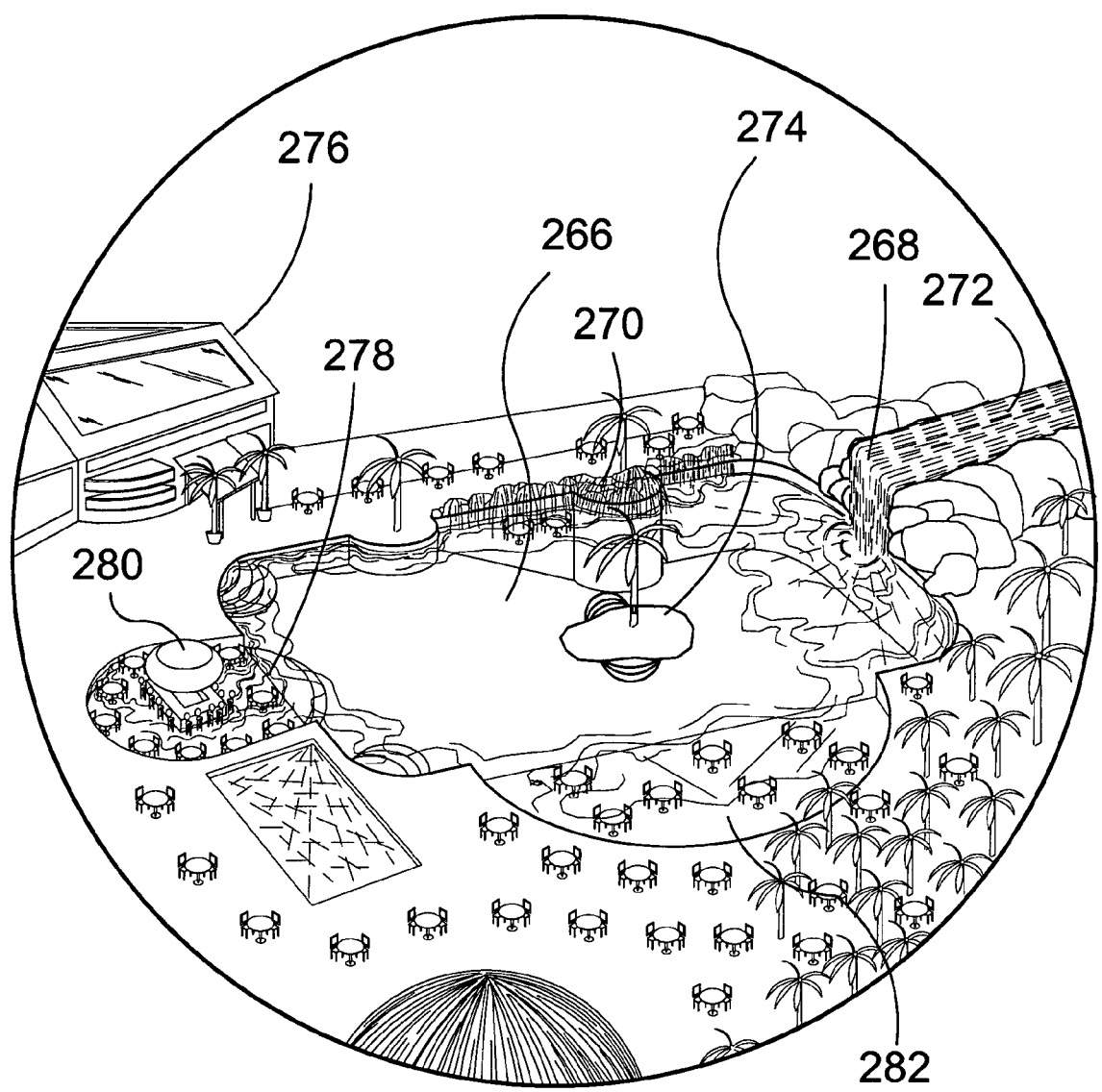
FIG. 14 is an illustrative view of the pool and stream of the present invention.

FIG. 14 is an illustrative view of the pool 266 and stream 260 of the present invention 10. The pool 266 is fed by ocean water through a pumping and filtration system 258 to the cascading waterfall 256 via the stream 260 to the pool 266. A second waterfall 270 in the pool 266 is linked to the main fall 268 for double filtration and having a sitting area under it. The water is constantly being refiltered as it goes through the cycle, so there is no need for chlorine as not to pollute the ocean.

Figure 15:
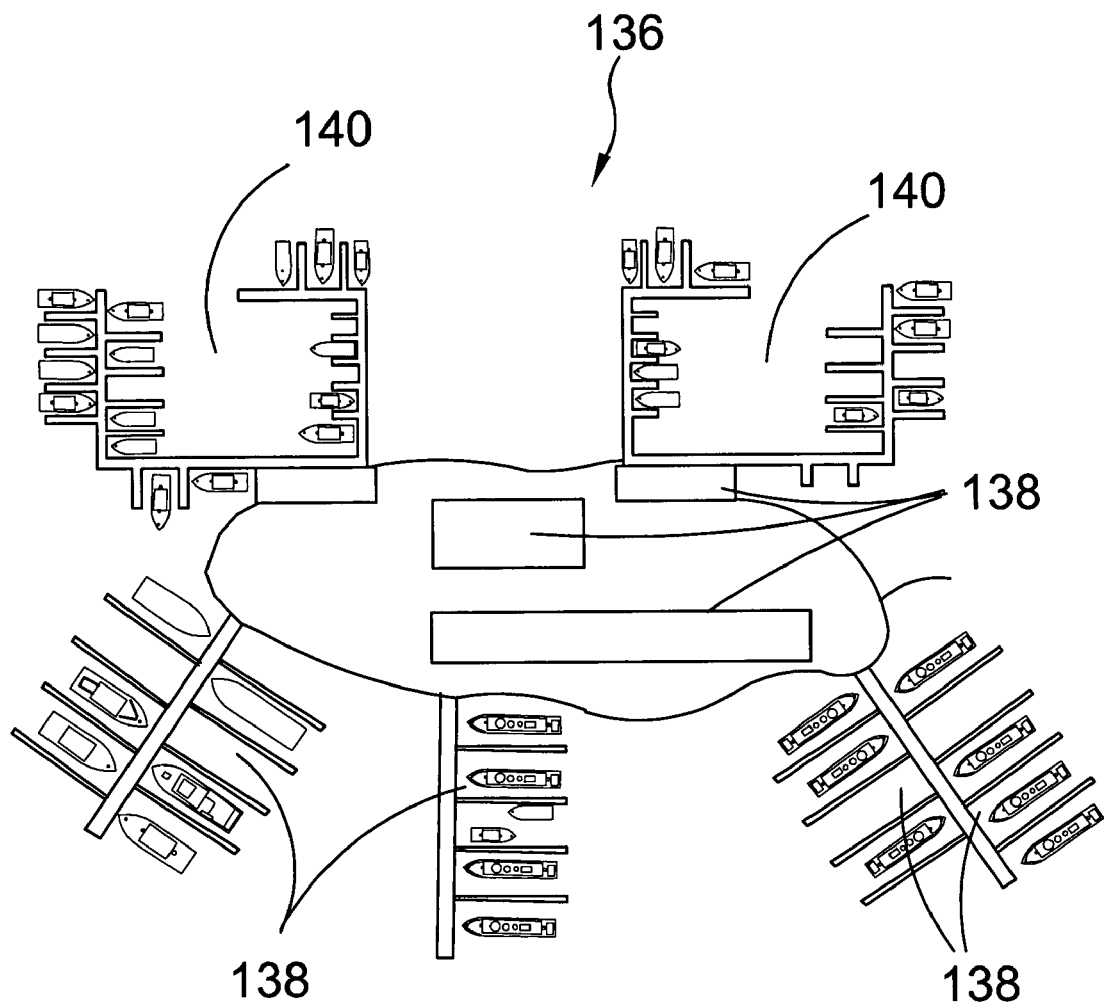
FIG. 15 is a top view of the boat slip station of the present invention.

FIG. 15 is a top view of the marina island 136 of the present invention 10. The marina island 136 is a floating embodiment having facilities 138 and large ship slips 142, 144 and small boat slips 140. No persons are to dock without prior nautical plans including cruise liners.

Figure 16:
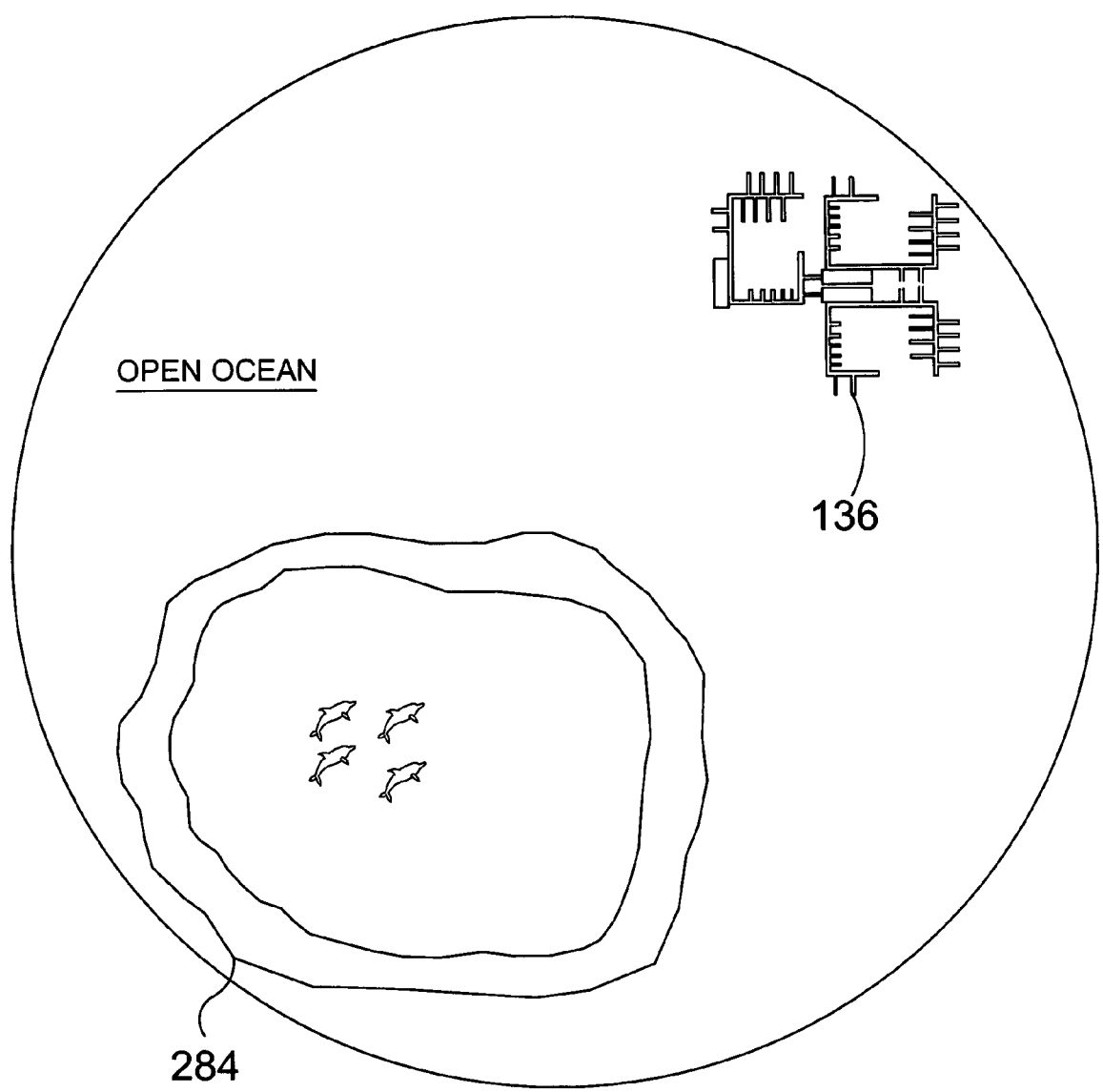
FIG. 16 is a top view of the aquarium island of the present invention.

FIG. 16 is a top view of the aquarium 284 of the present invention 10. The open ocean aquarium 284 of the present invention 10 is located on its own satellite island 24 close to the main island 22. It provides exotic sea life for the publics viewing. The guests 370 can interact with the marine life under the guidance and supervision of a professional staff. The transportation facilities for the aquarium 284 are located away from the area so not to disturb its inhabitants.

Figure 17:
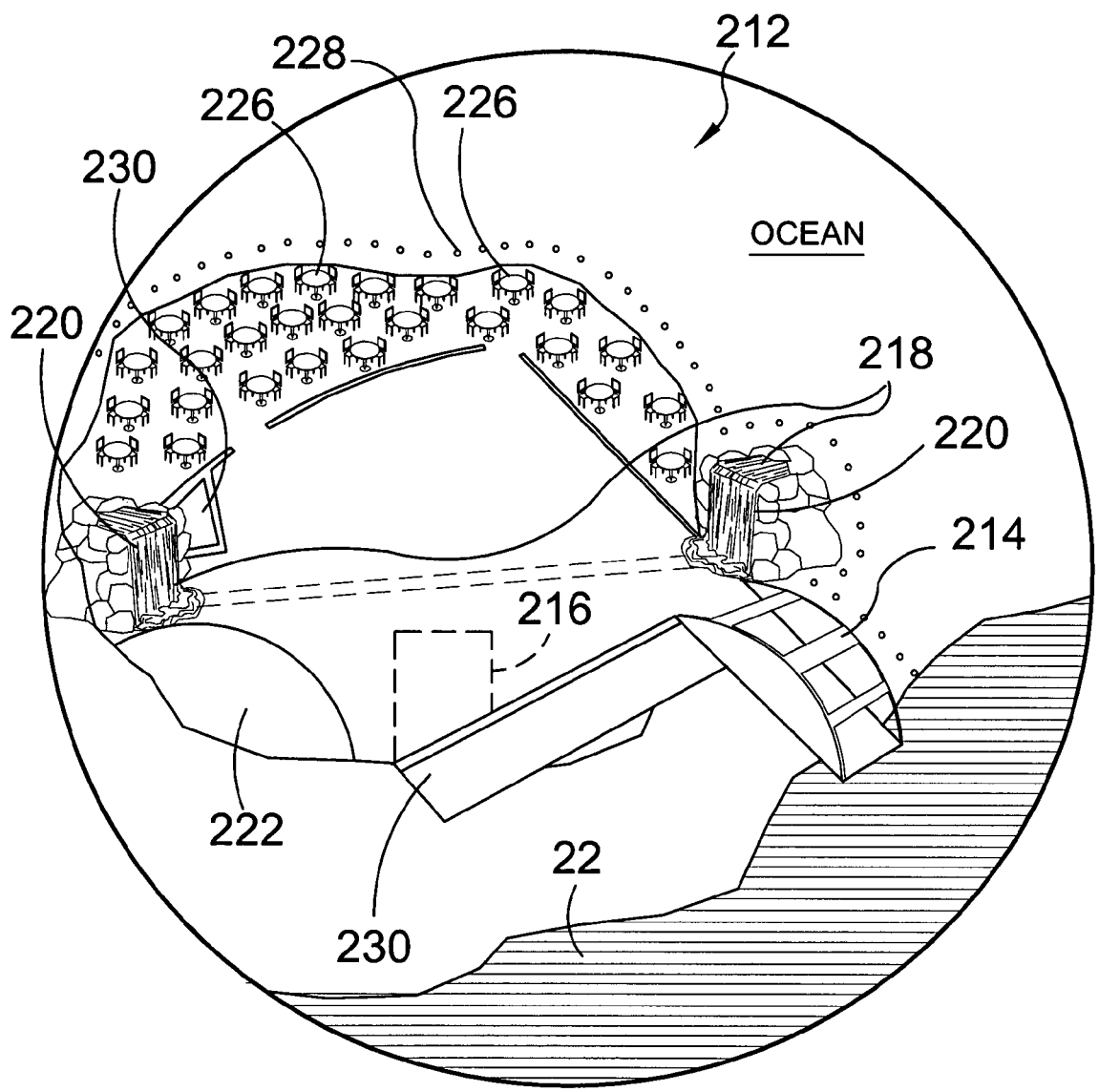
FIG. 17 is a top view of the floating nightclub of the present invention.

FIG. 17 is a top view of the floating nightclub 212 of the present invention 10. The floating nightclub 212 of the present invention 10 is supported by concrete stanchions and is accessible by an arched footbridge 192 and provides security check 216 upon entering. The island shaped nightclub 212 comprises two indoor waterfalls 218 that are linked together and fed by ocean water, see through dance floor 224 and stage 222, two bar areas 230, tropical setting and lounge deck. A tight mesh net surrounds the nightclub 212 as a safety net 226 and is above water so as not to trap fish. There is no access to the underside portion of the floating nightclub 212 with the exception of a repair entrance.

Figure 18:
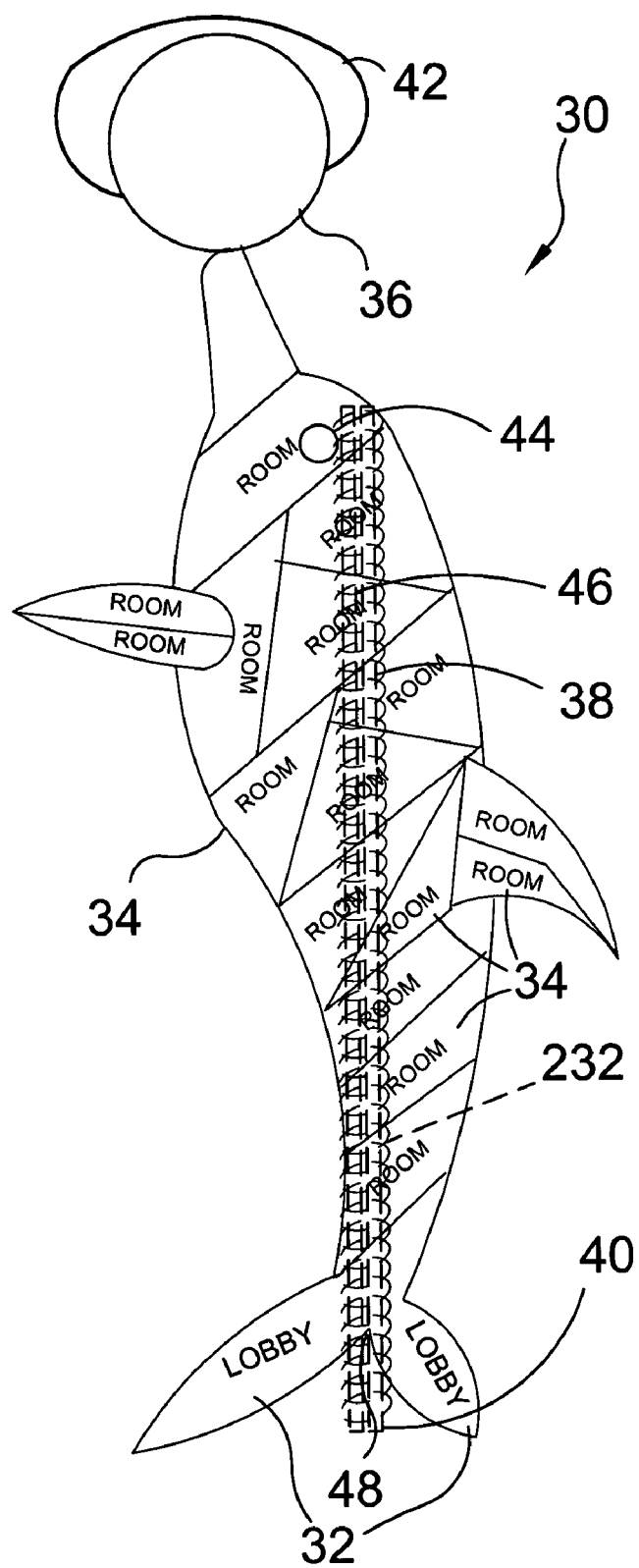
FIG. 18 is a view of the dolphin shaped guest quarters of the present invention.

FIG. 18 is a view of the dolphin shaped guest quarters 30 of the present invention 10. There are six different dolphin guest quarters 30 on the main island 22. Each dolphin form will be standing upright on their flukes and facing in different directions due to the lights 44 from the eyes and are located on various parts of the main island 22. Elevators 46 go up from the lobby 32 and are surrounded by a spiral ramp 49 for emergency situations through the middle of the structure. Ocean water is pumped up a cylinder 39 through the elevator 46 to feed water to the penthouse 36 for aesthetic purposes.

Figure 19:
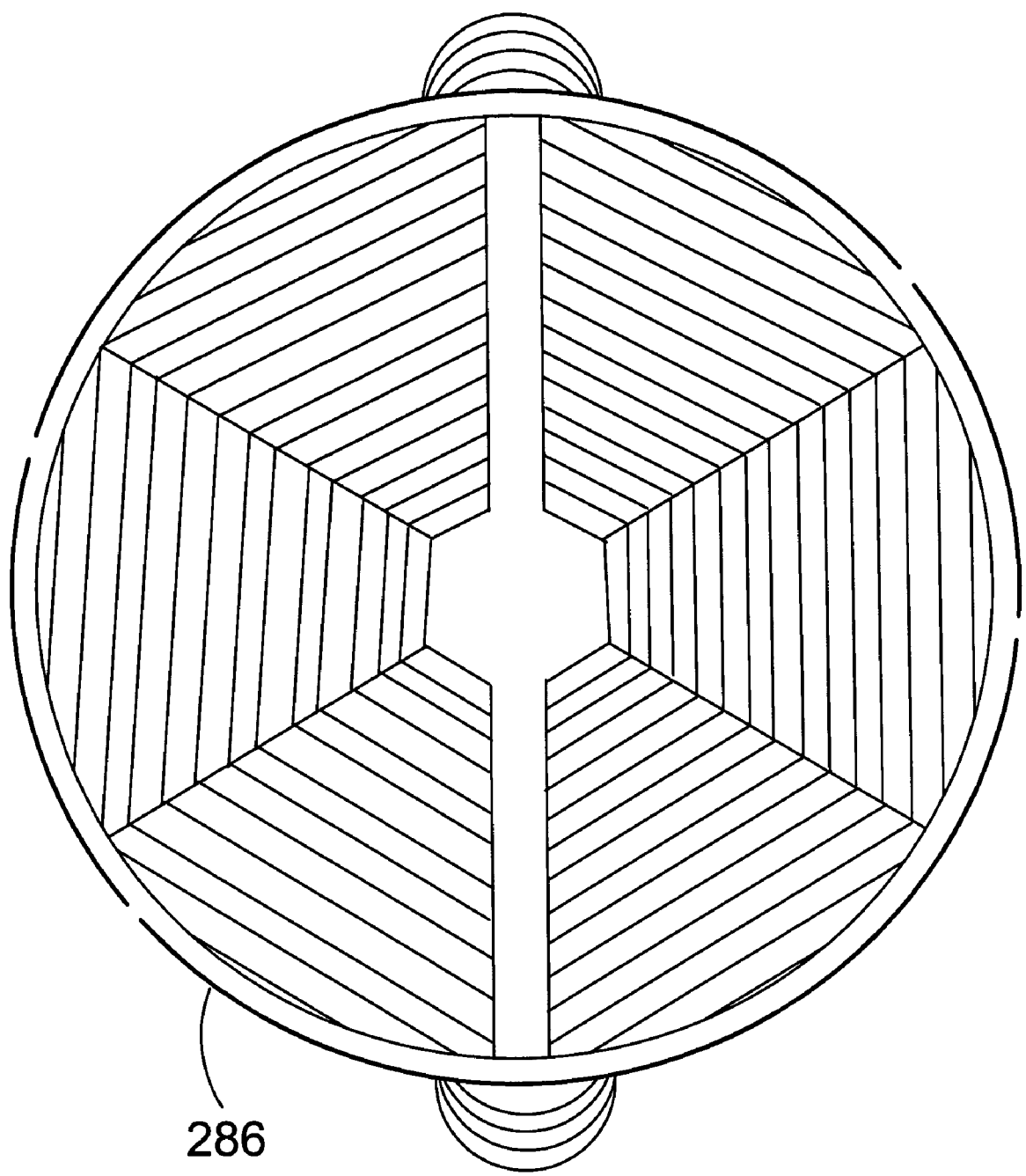
FIG. 19 is a top view of the planetarium of the present invention.

FIG. 19 is a top view of the planetarium of the present invention. The 3D planetarium 286 of the present invention 10 is provided for the guests of the complex 10 and is an educational facility providing animal life and marine life, astrology as well as bible films.

Figure 20:
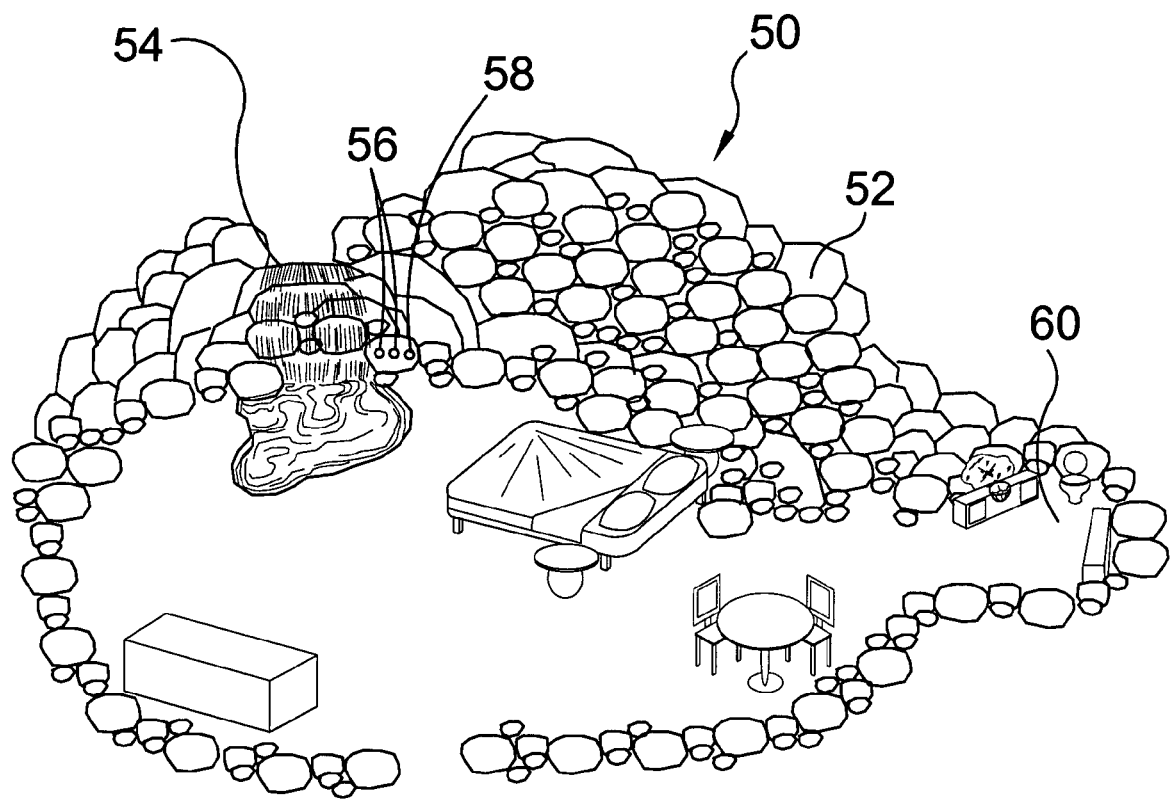
FIG. 20 is a top view of the island bungalows of the present invention.

FIG. 20 is a top view of the island bungalows 50 of the present invention 10. The island bungalows 50 are shaped like a cave having a constant flowing waterfall 54 that may be turned from salt water to fresh water as required by the visitor adding a dual purpose of beauty and shower and presenting a feeling of the outdoors. There is a control switch 56 and pump provided in each unit. There is also a flow switch for all bungalows over water and on land for the water falls.

Figure 21:
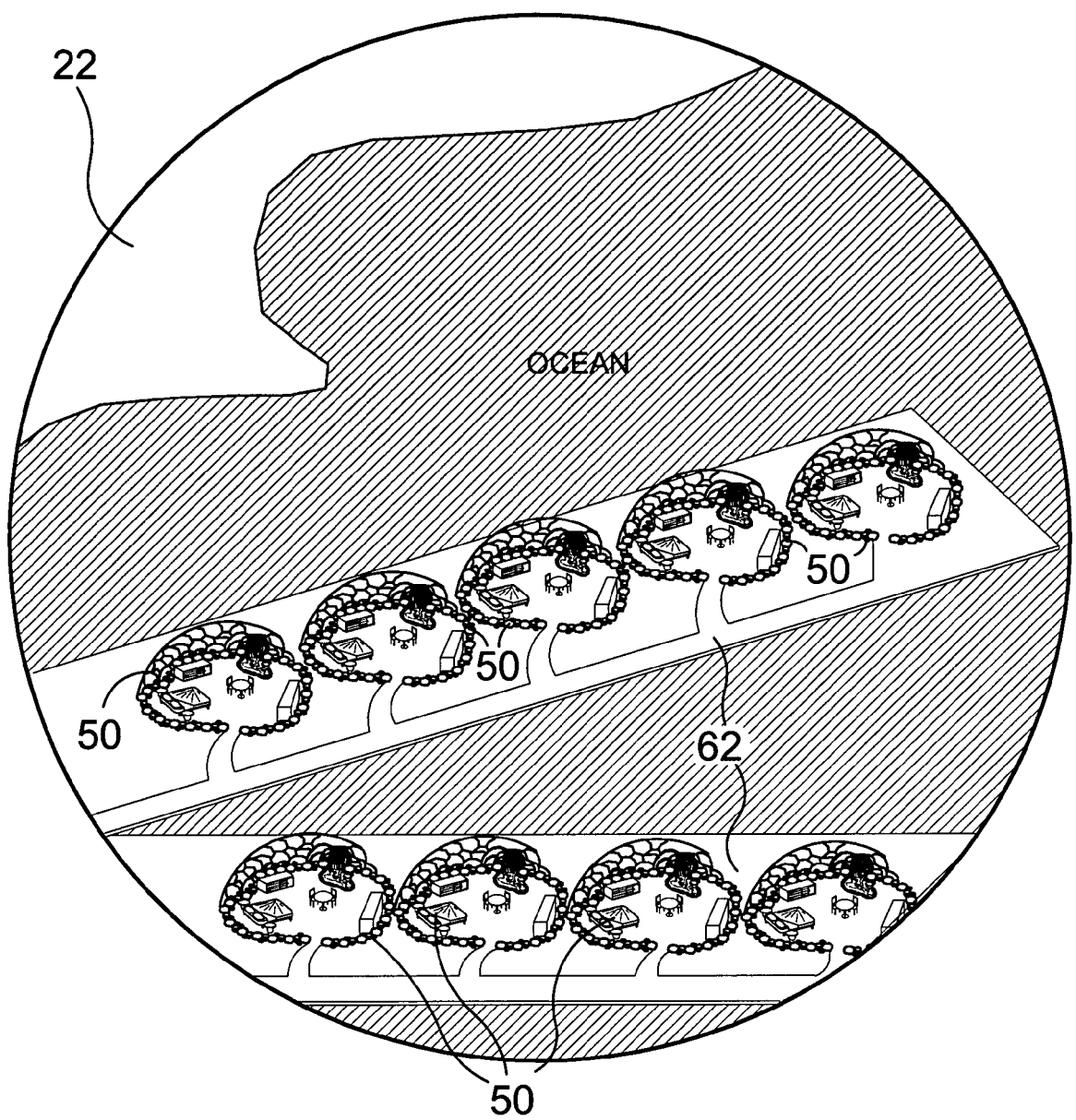
FIG. 21 is a view of the above water bungalows of the present invention.

FIG. 21 is a view of the above water bungalows 50 of the present invention 10. A plurality of above water bungalows 50 are shaped like caves having a constant flowing waterfall 54 that may be turned from salt water to fresh water as required by the guests including hot and cold water, each unit having its own controls 56. The bungalows 50 are located on a boardwalk 62 stretching over the water. Room settings will differ from illustration shown above. Each waterfall 54 will have its own flow switch 58 and can be located in different areas of the room depending on its view.

FIG. 22 is a chart of other activities of the present invention 10. The above chart describes further activities visitors can enjoy on the complex of the present invention 10.

Figure 23:
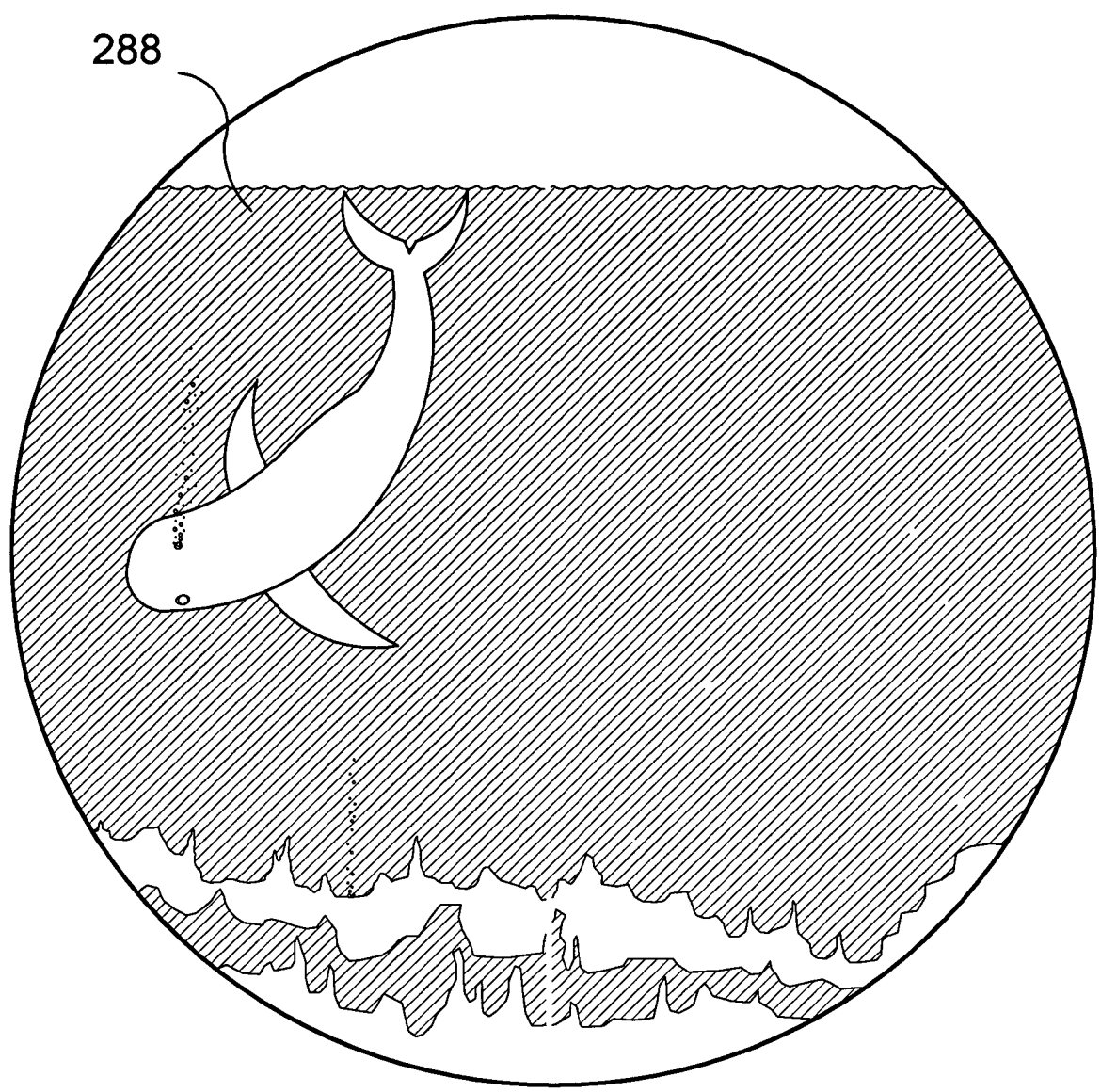
FIG. 23 is an illustrative view of the whale open ocean habitat of the present invention.

FIG. 23 is an illustrative view of the whale open ocean habitat 288 of the present invention 10. The above illustration shows the whale open ocean habitat 288 located on a separate part of the island. The facilities have various sea life that will exhibit them in their natural habitat which may entail the inclusion of mating pairs as determined by the marine biology staff. The above illustration shows the whale open ocean tank 288 located on a separate side of the island. Certain habitat parameters are variable to trigger certain biological function to mimic their natural habitat, e.g. water temperature variation to mimic migration scenario.

Figure 24:
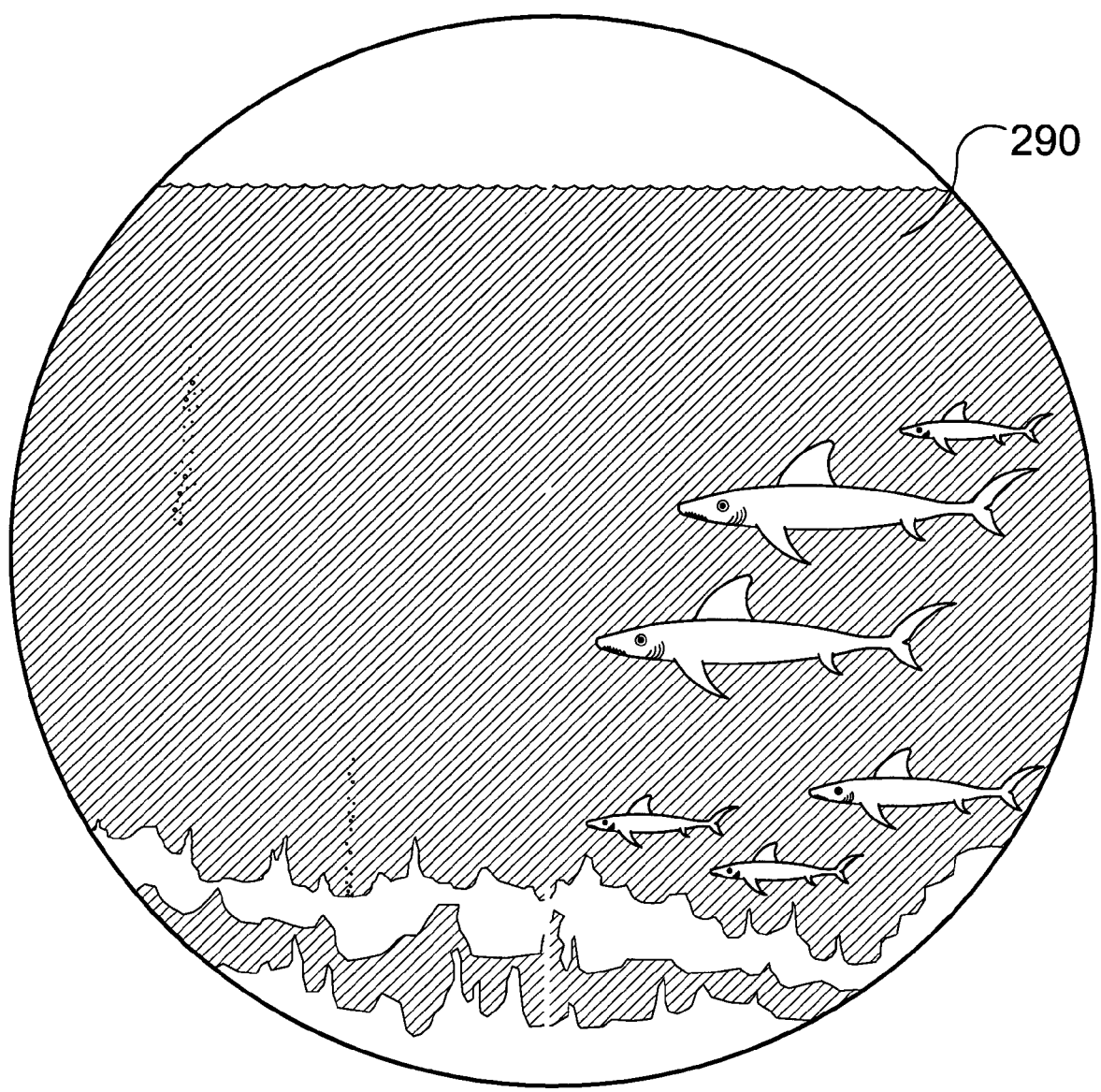
FIG. 24 is an illustrative view of the shark open ocean habitat of the present invention.

FIG. 24 is an illustrative view of the open ocean shark tank 290 of the present invention 10. The facilities have various sea life tanks that will exhibit them in their natural habitat which may entail the inclusion of mating pairs as determined by the marine biology staff. The above illustration shows the open ocean shark habitat 290, located on one part of the island. Certain habitat parameters are variable to trigger certain biological function to mimic their natural habitat, e.g. water temperature variation to mimic migration scenario. Also available are protective enclosures whereby guests can view the sharks in their natural habitat.

Figure 25:
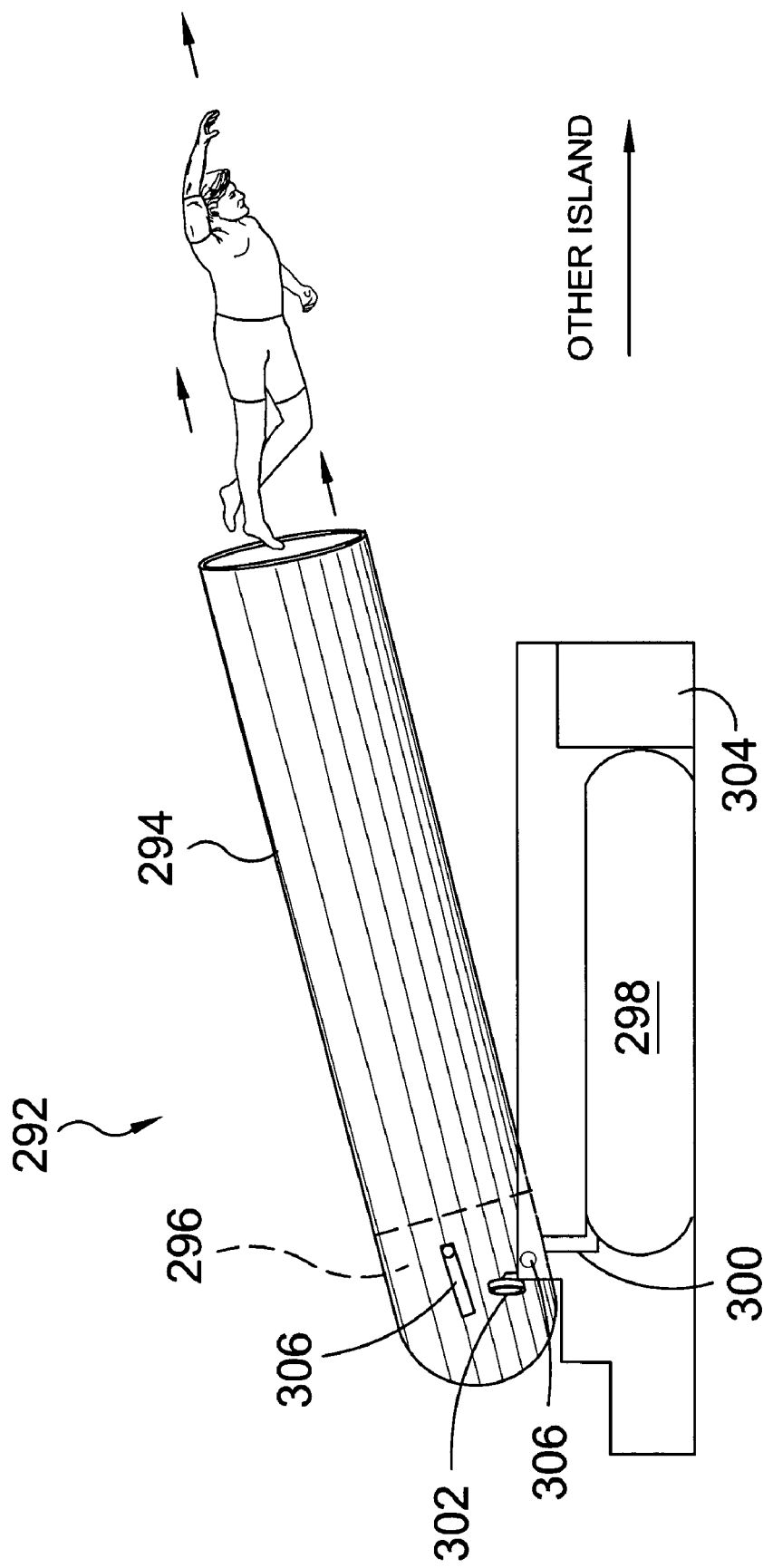
FIG. 25 is an illustrative view of the compressed air cannon of the present invention.

FIG. 25 is an illustrative view of the air cannon 292 of the present invention 10 in use. Shown is a compressed air cannon 292 using a generator 304 to pump air into a compression chamber 296, and capable of distance regulation by the amount of air showing on the valve 302 is provided as an additional activity. The air cannon 292 is designed to shoot guests 370 into the water at a pre-selected angle. The cannon 294 will be able to accommodate about 250 pounds. The air cannon 292 is held stable by bolts to the island surface. The air cannon is comprised of a cannon 294 with an aluminum compression chamber 296 welded within the compartment, and has a weather sealant. In operation, a cannoneer pushes a switch on the valve connected to the generator 304 that activates the latch, and then allows for compressed air to shoot a person into the water at a pre-selected angle. Special gear is worn by the user for additional safety.

Figure 26:
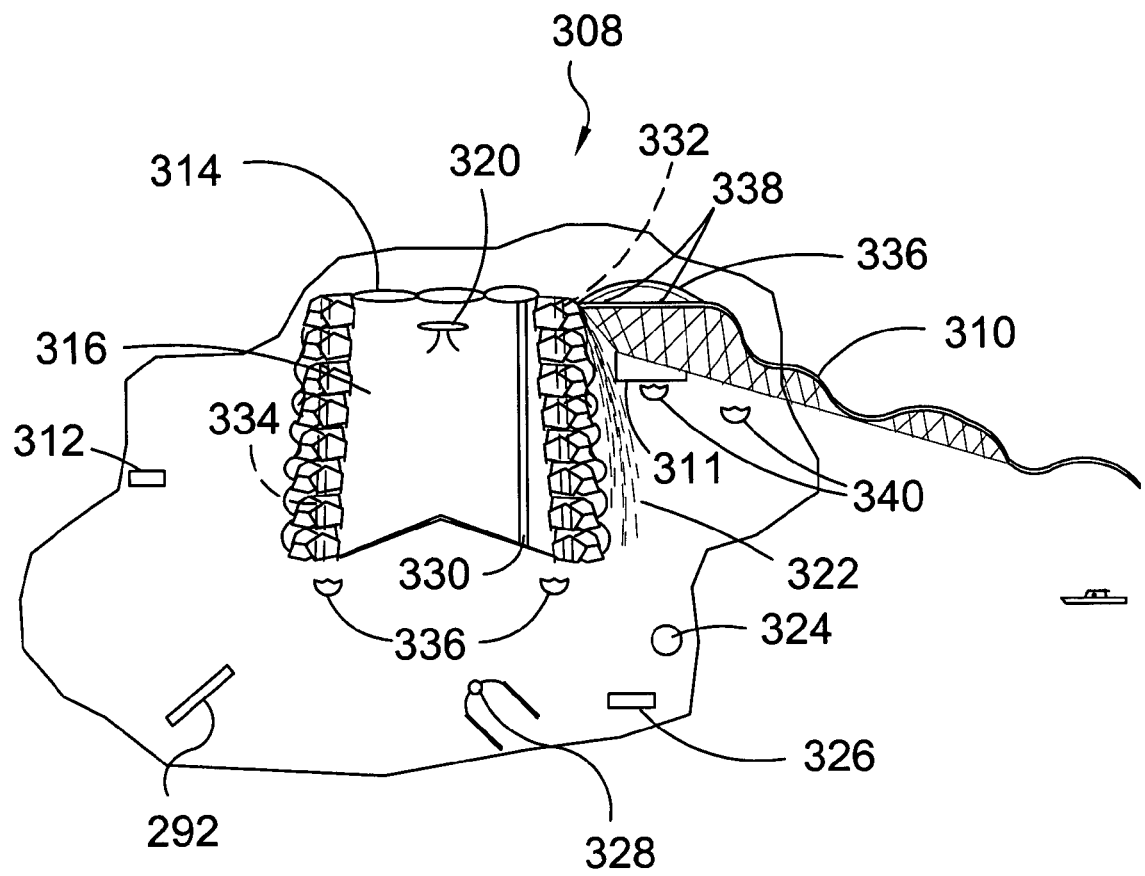
FIG. 26 is an illustrative view of the activity mountain of the present invention.

FIG. 26 is an illustrative view of the activity mountain 308 of the present invention 10. Shown is a view of the 100 foot activity mountain 308 which is located on its own satellite island 24 having a plurality of activities, a restaurant 318 and facilities for its guests 370. Included in the activities are the cannon 292, skydiving 314, hot air balloon 324, bungee jumping 316, skateboarding and BMX biking 312 and slingshot bobsled run 310 with a safety net 311 and others. The slingshot 328 consists of an elastomeric sling with a collapsible seat, when sprung, the user can travel a predetermined distance into the water. The mountain 308 is illuminated by red lights 336 in the evening; the arched bridge 336 with white lighting 338 and the bobsled run 310 is awash in royal blue light 340 to provide a dynamic effect. Ocean water is drawn through a feed pipe 332 for the bobsled run 310 and waterfall 322 and desalinated water is supplied for human and pet consumption.

Figure 27:
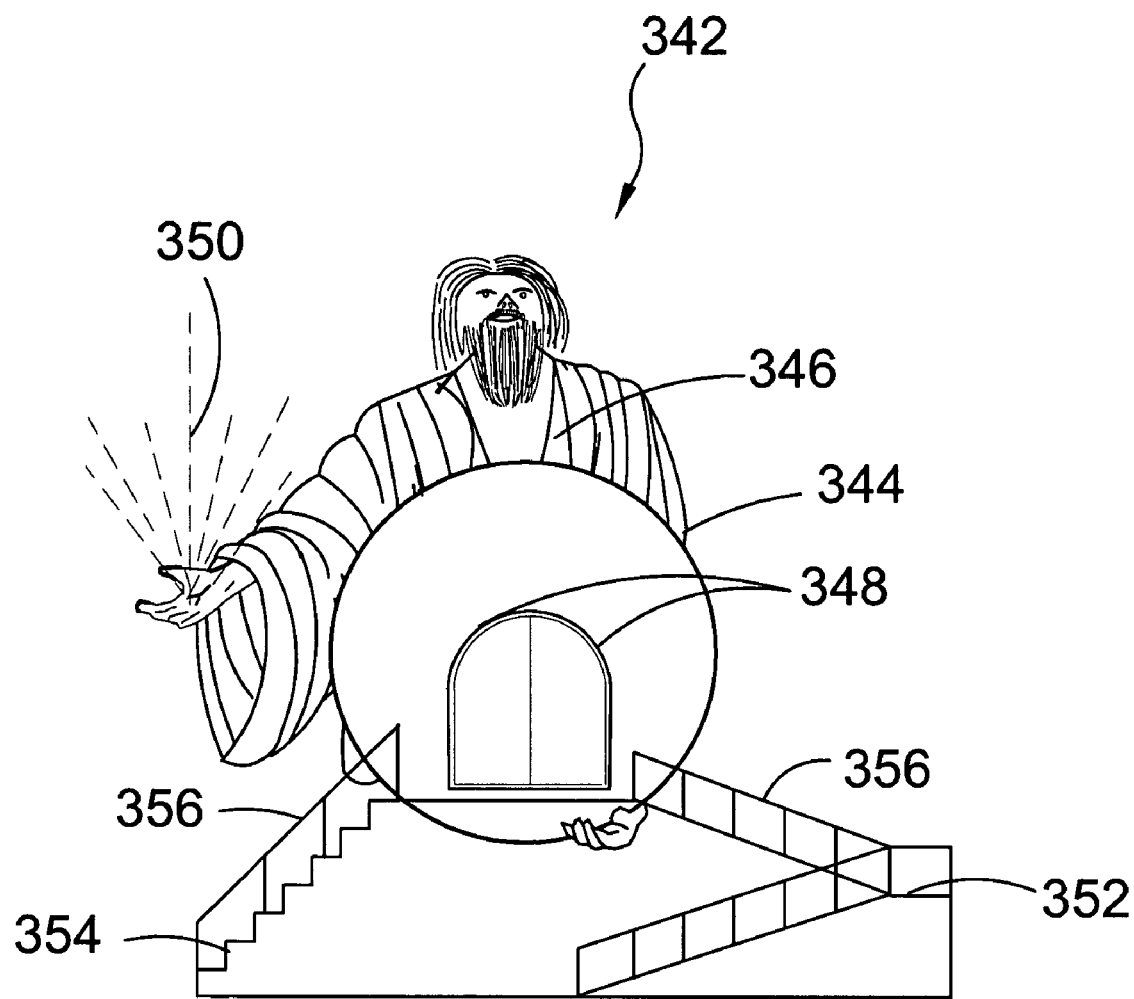
FIG. 27 is an illustrated view of the church of the present invention.

FIG. 27 is an illustrative view of the church 342 of the present invention 10. Shown is a view of the church 342 located on the main island 22. The shape of the church 342 and positioning of structural architecture may not be depicted as it will appear upon completion. The figure of God will have very faint blue eyes and will be looking up towards heaven. He will be wearing a royal blue robe 344 with gold trim 346 and access is provided therein through metallic gold doors 348. a white beam of light 350 will be ascending from his upraised hand. God is holding the church in the shape of the earth representing all that he has created.

Figure 28:
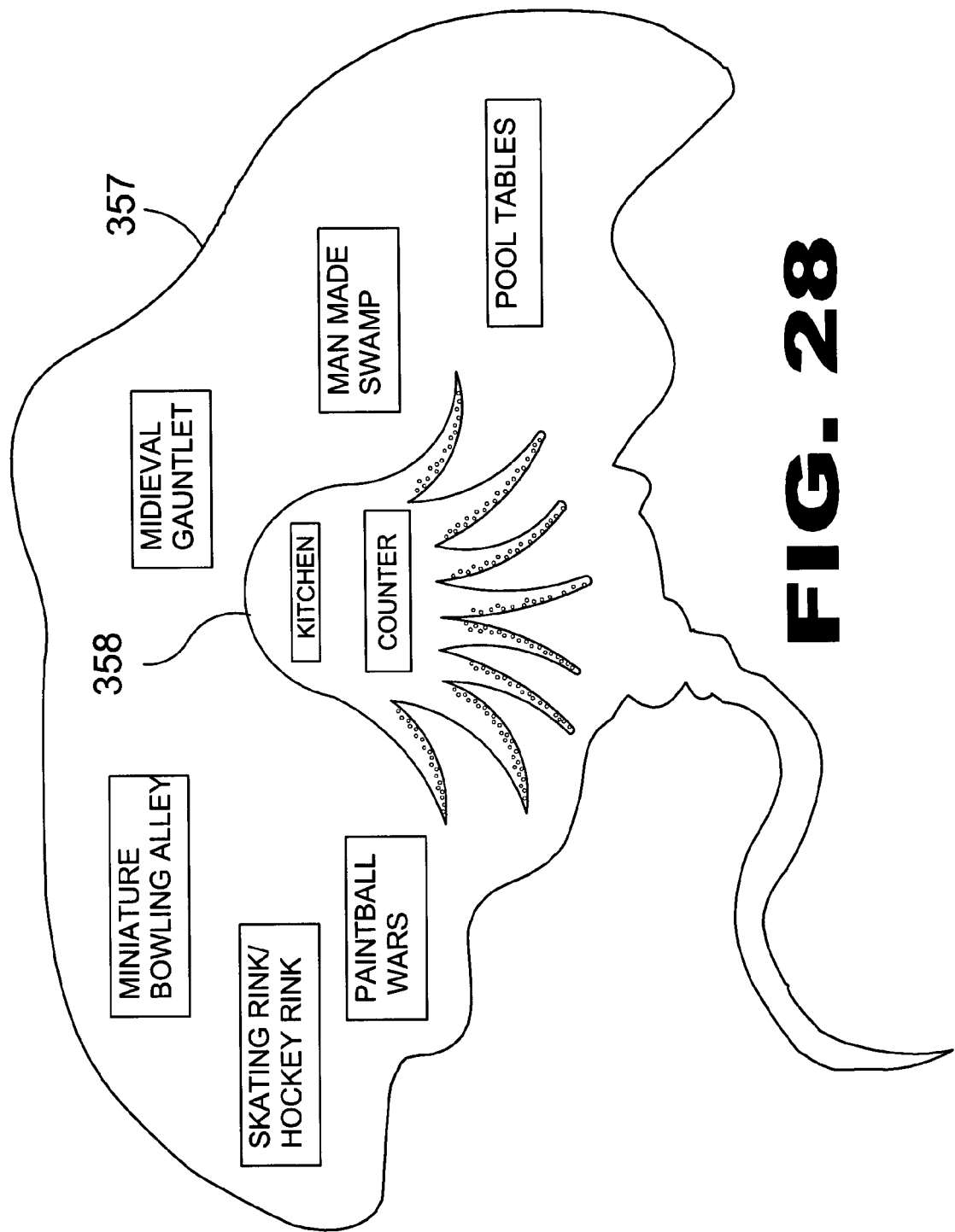
FIG. 28 is an illustrative view of the underwater restaurant of the present invention.

FIG. 28 is an illustrative view of the stingray arcade 357 with octopus restaurant 358 of the present invention 10. Shown is a view of the under water restaurant 358 inside the arcade in the shape of an octopus. Stingray is also a snack bar that children can acquire food and drink using tokens that are also used to play the provided games with or they would be issued a money card.

Figure 29:
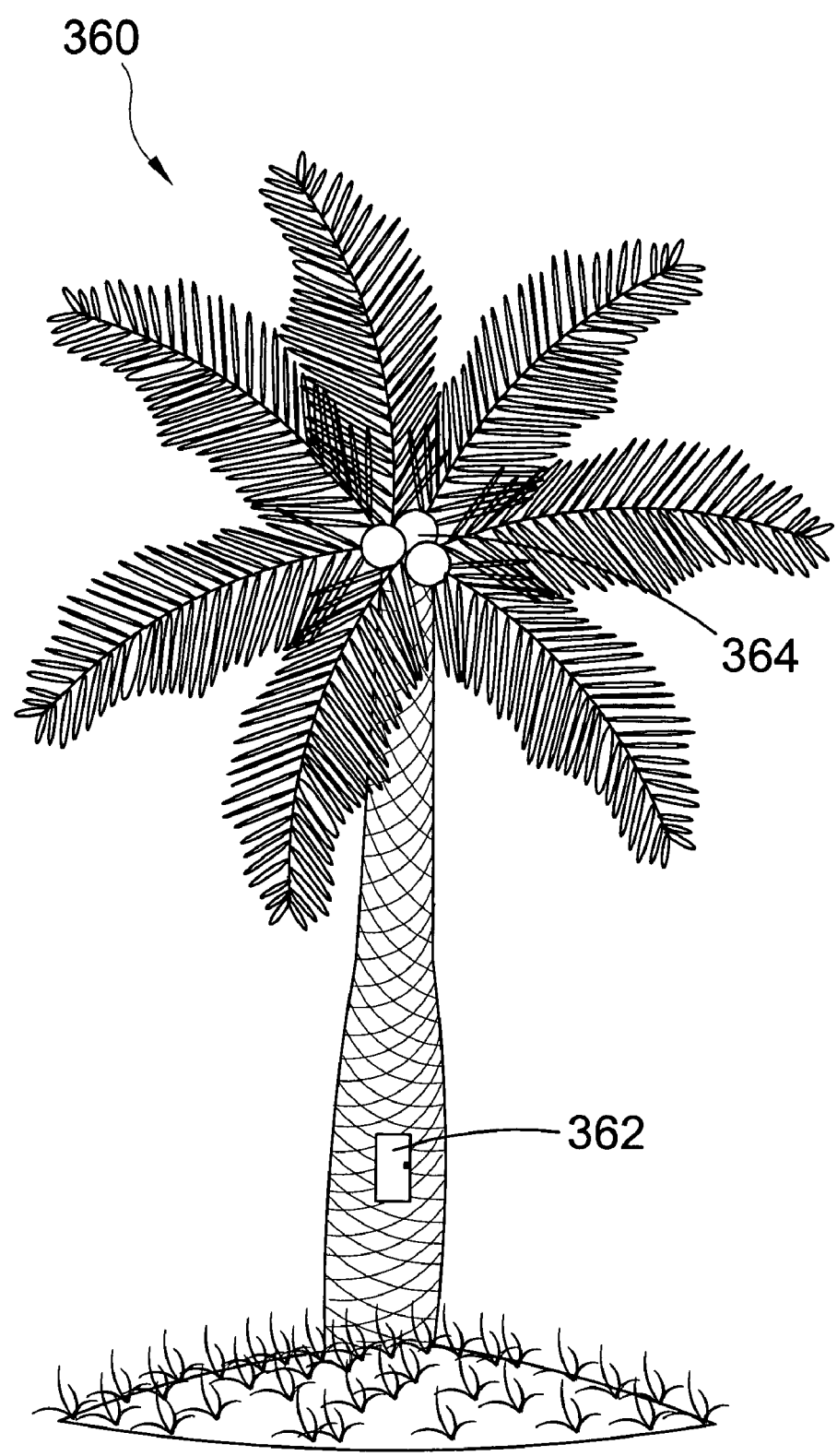
FIG. 29 is an illustrative view of a telephone of the present invention.

FIG. 29 is an illustrative view of a telephone kiosk 360 of the present invention 10. Phone kiosks 360 are sized and shaped to resemble palm trees and will be located all around the island for the convenience of the visitors and will be equipped with single push button direct links to security, EMT and hotels. The replica coconuts on the palm tree will be equipped with surround sound 364 speakers. Outside lines will be prohibited. The phones will have a code for the handicapped. Turning the push button into voice activation with a tiny microchip acknowledging the code. The code will never change. The phones will be set high enough so children cannot play with them.

Figure 30:
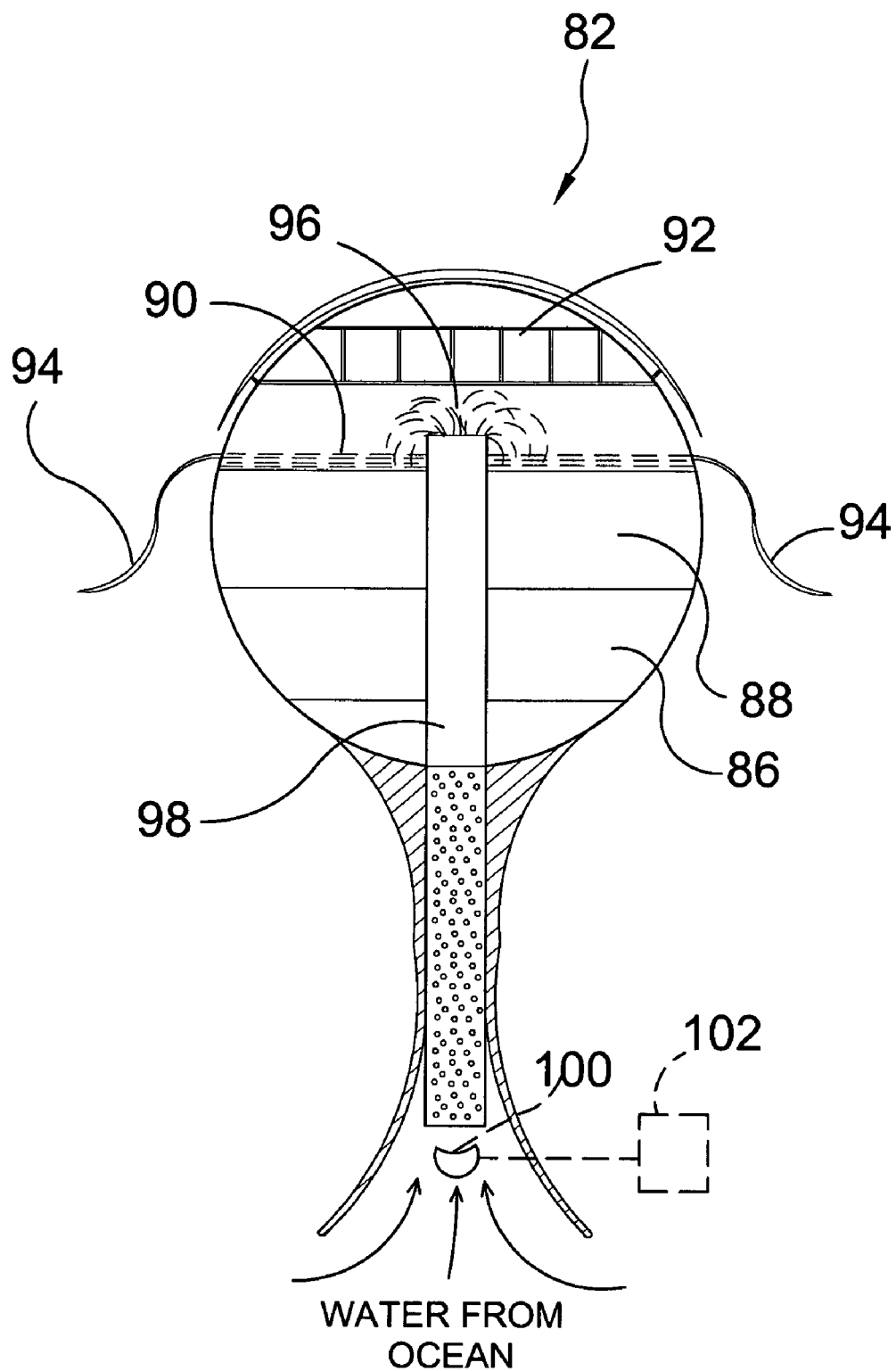
FIG. 30 is an illustrative view of a tri-level unit of the present invention.

FIG. 30 is an illustrative view of a tri-level guest unit 82 of the present invention 10. Twenty tri-level units 82 are provided within the ocean waters. The shape of each tri-level guest unit 82 will be of a golf tee, following the theme of the resort. They will all be scattered close to the main island 22 with access by an arched bridge. The ocean water will regenerate itself like all other units but here, not only will the ocean water act like a shower 96 with hot and cold water and flow switch, but the third floor has a pool 90 with water slides 94 into the ocean. All tri-level guest units 82 include a hydraulic retractable ceiling 108. The first floor will be entry living area 86. The second floor is for bedrooms for kids 88 and the third floor 90 will have an inside waterfall 96 fed by a round cylindrical pipe 96 for the pool 90 as well as showers. The master bedrooms 92 will have an array of foliage, giving a tropical feeling. There is also a wet bar for adults 104 There is a children's bar 106 located on the second floor 88. All units are clear. The through cylinder 98 will have different color lights 100 for each unit 88, following the theme of rainbow. The light beams 100 project into the cylinder 98 with a luminescence control switch 102. Also provided is a handicap entrance and handicap friendly facilities. The present invention 10 takes ocean water and puts it through the desalination process for all purposes requiring water.

Figure 31:
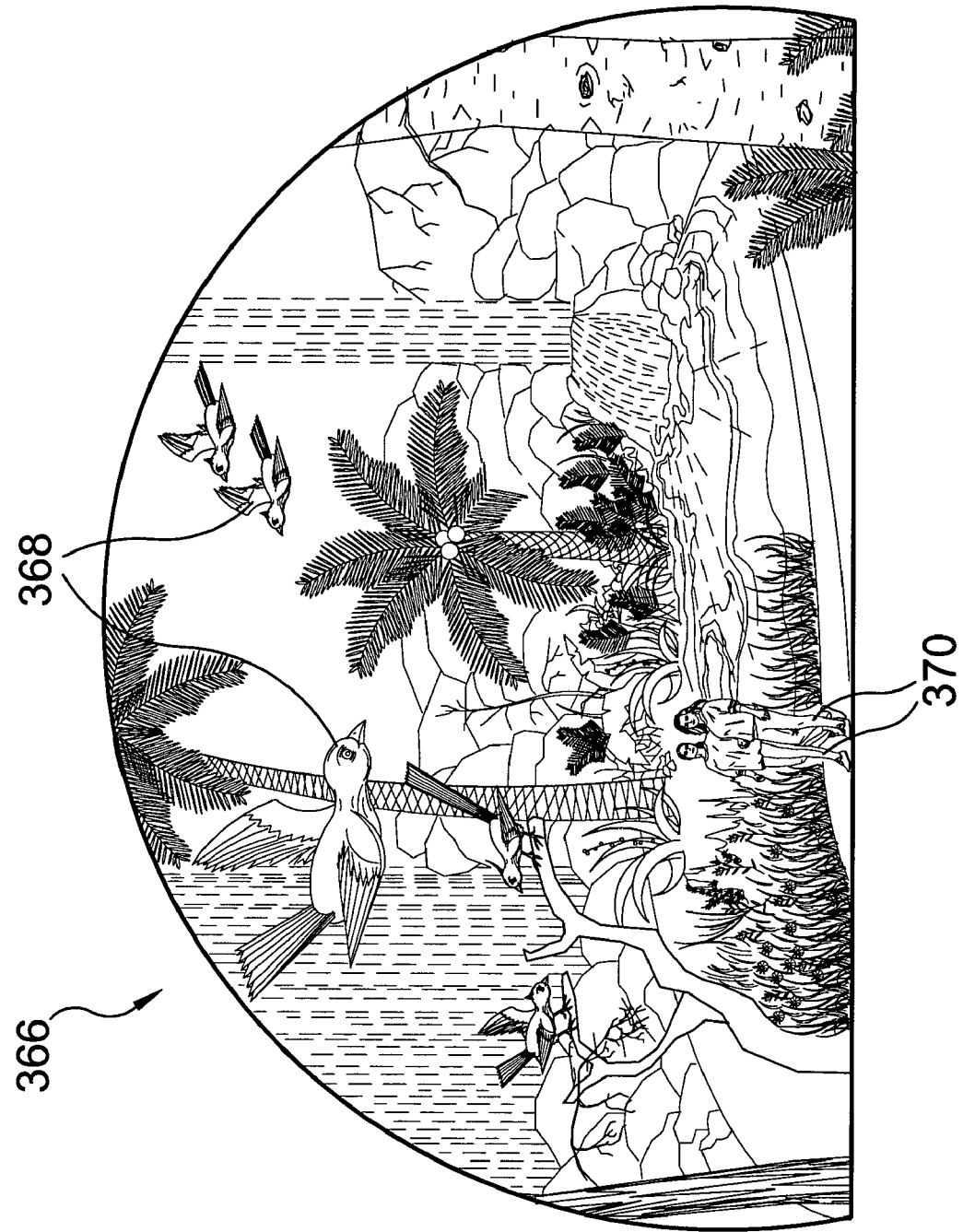
FIG. 31 is an illustrative view of the rain forest enclosure of the present invention.

FIG. 31 is an illustrative view of the rain forest enclosure 366 of the present invention 10. Shown is a climate controlled rain forest enclosure 366 for public awareness of the importance of the eco-system. The rain forest 366 has sound effects, actual rain, actual animals from the rain forest 368 and the like. The trees and other vegetation are designed to look like authentic plant life from the rain forest but are synthetic and mechanized. Periodically, a computerized replica of a bulldozer comes through to knock down the trees and vegetation to simulate the horrors of man destroying the rain forests and to educate people of the losses our planet is suffering and will never be able to reclaim. Unlike the actual rain forests, the trees and vegetation spring back to their original glory when the bulldozer leaves.

Figure 32:
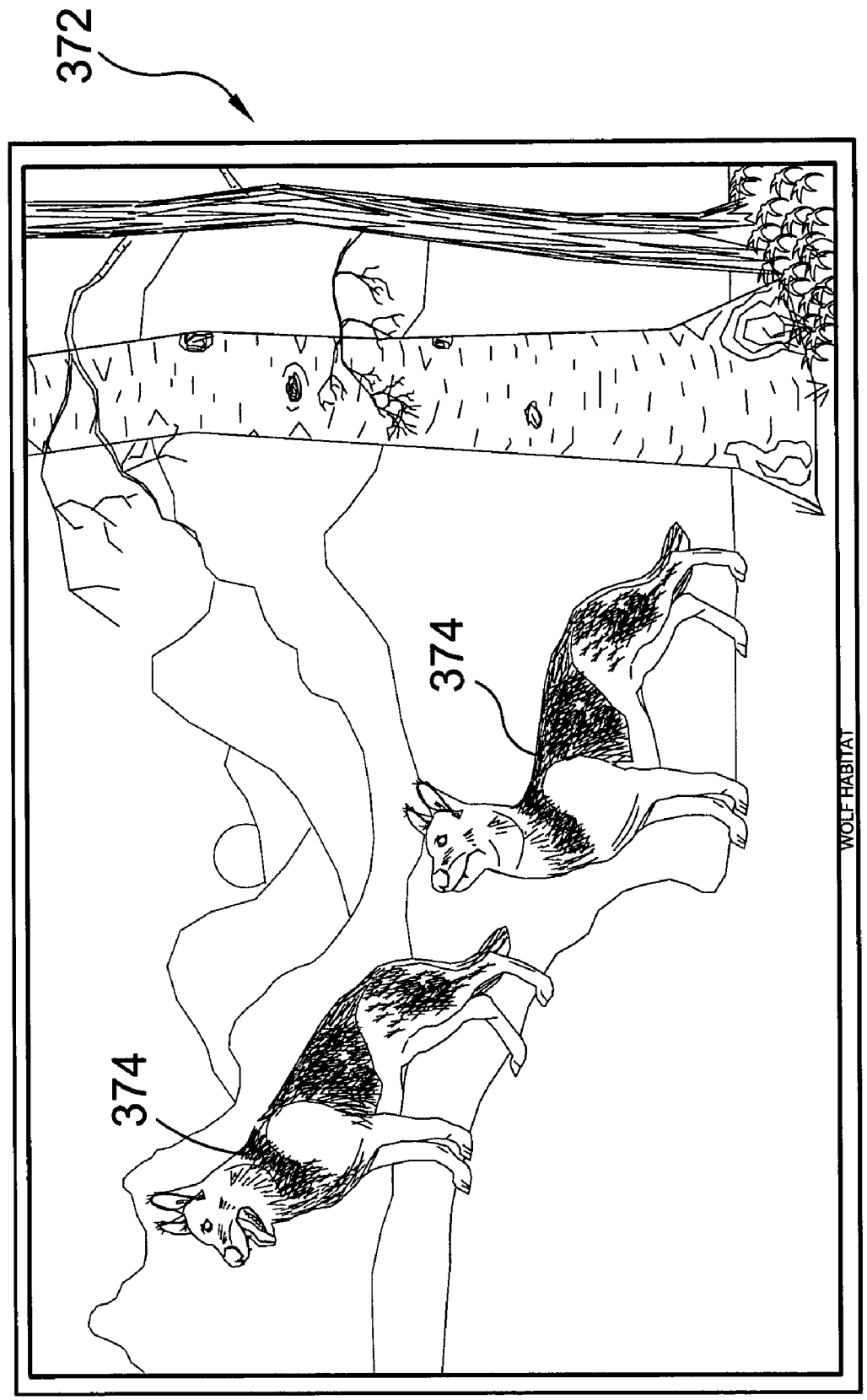
FIG. 32 is an illustrative view of the wolf habitat enclosure of the present invention.

FIG. 32 is an illustrative view of the wolf habitat enclosure 372 of the present invention 10. Shown is a wolf habitat enclosure 372 for public awareness of the importance of the eco-system and endangered species. The wolf habitat 372 can change in appearance to depict the arctic, mountain or woodland environments and natural habitats of the wolf 374. The wolf habitat 372 is located on the main island 22 for viewing by the guests 370. Guests 370 can participate to a certain extent. The wolf habitat 372 has tropical and sub-zero conditions to let the wolves 374 roam through different habitats.

FIG. 33 is a chart of the present invention 10 showing other services, facilities and protocol of the present invention 10.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A man-made island resort complex with entertainment, educational and lodging facilities comprising:
   a) a buoyant base support structure capable of floating on a body of water;
   b) means for anchoring said base support structure to the sea floor so as to remain in a specific, preselected location regardless of currents, tides, wind and other such destabilizing factors;
   c) surface and underwater facilities affiliated with said base support structure; and a plurality of means for transporting people and cargo thereto, wherein said surface and underwater facilities include lodging for guests and staff, a plurality of said guest lodging facilities are provided both on the surface and underwater, said surface based guest lodging facilities include a plurality of dolphin-shaped hotels and each said dolphin shaped hotel comprises:
      i) a lobby;
      ii) a plurality of guest rooms;
      iii) a penthouse with a retractable ceiling;
      iv) a water tube leading from the hotel base to the penthouse passing through the elevator with ocean water flowing therethrough;
      v) a sub water plump to transfer ocean water to the penthouse; and
      vi) external royal blue lights emanating from the dolphins eyes.

2. A man-made island resort complex with entertainment, educational and lodging facilities as recited in claim 1, wherein said base support structure is fabricated of an aero-gel material.

3. A man-made island resort complex with entertainment, educational and lodging facilities as recited in claim 1, wherein a plurality of base support structures form a main island and linked satellite islands.

4. A man-made island resort complex with entertainment, educational and lodging facilities as recited in claim 1, wherein said surface based guest lodging facilities further include a plurality of cave-shaped bungalows located on a boardwalk over the water with said bungalows comprising:
   a) an external dome-like structure resembling natural stone;
   b) an interior waterfall and basin for bathing and aesthetic purposes;
   c) hot and cold water control switches with flow switch;
   d) means for changing the water introduced into the basin from the waterfall from salt water to fresh water as needed; and
   e) a toilet area with hot water.

5. A man-made island resort complex with entertainment, educational and lodging facilities as recited in claim 1, wherein said underwater guest lodging facilities include a plurality of independent underwater rooms comprising:
   a) an exterior portion manufactured of bulletproof glass with each room shaped like a different form of exotic sea life;
   b) fresh air and ventilation ducts;
   c) a room access port;
   d) a door to the room;
   e) a door to the tube;
   f) a surface-based lobby;
   g) an enclosed escalator tube for transporting people and gear from the lobby to said underwater room;
   h) emergency air tanks; and
   i) fire extinguishers.

6. A man-made island resort complex with entertainment, educational and lodging facilities as recited in claim 5, wherein said escalator tube includes an escalator that collapses to a flat ramp in the event of a power outage.

7. A man-made island resort complex with entertainment, educational and lodging facilities as recited in claim 1, wherein said guest lodging facilities further includes a plurality of tri-level units shaped like golf balls on tees which are partially submerged in the ocean waters comprising:
  a) a spherical habitat manufactured of transparent bulletproof glass;
  b) a first floor living area;
  c) a second floor children's bedroom;
  d) a third floor swimming pool;
  e) a master bedroom;
  f) water slides to the ocean from said third floor;
  g) a closed waterfall feeding the third floor pool with ocean water;
  h) a transparent water feed cylinder extending centrally from the ocean water at the bottom of the structure to said closed waterfall on said third floor to supply water thererto;
  i) a light source projecting upward through said water feed cylinder to illuminate the cylinder and the water passing therethrough;
  j) a luminescence control switch for said light source;
  k) a wet bar on said third floor;
  l) a children's bar located on said second floor; and
  m) a hydraulic retractable ceiling.

8. A man-made island resort complex with entertainment, educational and lodging facilities as recited in claim 1, wherein all said facilities are designed and constructed to be handicap and pet accessible and user-friendly.

9. A man-made island resort complex with entertainment, educational and lodging facilities as recited in claim 1, wherein said transportation means includes:
  a) an airport for small planes on its own island which is supported by a concrete stanchion communicating with the sea floor;
  b) a marina island for ships; and
  c) a monorail system to transport people and cargo between the mainland and the man-made island resort complex.

10. A man-made island resort complex with entertainment, educational and lodging facilities as recited in claim 9, wherein said airport is on a satellite island comprising:
  a) one or more runways;
  b) at least one helicopter helipad;
  c) an air traffic control tower;
  d) an airport security, fire and rescue headquarters;
  e) an emergency medical services facility;
  f) an emergency vehicle hangar;
  g) an airport marina;
  h) a nautical plans facility adjacent said air traffic control tower;
  i) a visitor comfort station adjacent said air traffic control tower;
  j) a flight office adjacent said air traffic control tower; and
  k) landing lights.

11. A man-made island resort complex with entertainment, educational and lodging facilities as recited in claim 9, wherein said marina island comprises:
  a) a plurality of support and service facilities;
  b) a plurality of small boat portages;
  c) a plurality of large boat slips; and
  d) a plurality of ocean liner slips.

12. A man-made island resort complex with entertainment, educational and lodging facilities as recited in claim 9, wherein said monorail system comprises:
  a) at least one hermetically sealed monorail transport communicating between the mainland and said main island;
  b) concrete stanchions to support said monorail transport;
  c) a monorail track extending the length of each said monorail transport;
  d) at least one monorail train; and
  e) a passenger transport center at the end of the monorail transport on the man-made island resort complex.

13. A man-made island resort complex with entertainment, educational and lodging facilities as recited in claim 12, wherein said monorail train includes:
  a) a passenger compartment;
  b) a drivers compartment that is inaccessible from said passenger compartment; and
  c) windows with bulletproof glass in said drivers compartment and said passenger compartment.

14. A man-made island resort complex with entertainment, educational and lodging facilities as recited in claim 1, further including a vital services infrastructure comprising:
  a) a desalination plant on said man-made island resort complex to convert sea water to fresh water for use in all facilities;
  b) a security force;
  c) medical facilities and personnel;
  d) a communications network throughout all facilities including voice-activated telephone kiosks resembling palm trees having a surround sound speaker system within the faux coconuts;
  e) a turbo-generator power facility to provide the bulk of needed electricity to the complex;
  f) solar panels having means for harvesting, storing and distributing solar energy;
  g) a church in the shape of the Earth being held by Jesus wearing a blue robe with gold trim, the doors thereof being a metallic gold;
  h) a chemical waste disposal plant;
  i) a water pumping station;
  j) laundry facilities;
  k) workers quarters;
  l) a welcome building and information center for guests;
  m) 24 hour emergency facility for guests;
  n) 24 hour emergency veterinary hospital; and
  o) novelty shops.

15. A man-made island resort complex with entertainment, educational and lodging facilities as recited in claim 14, wherein said turbo-generator power facility comprises:
  a) at least one sea water intake line;
  b) at least one turbo-generator;
  c) a water outtake line; and
  d) a power distribution line.

16. A man-made island resort complex with entertainment, educational and lodging facilities as recited in claim 14, wherein said chemical waste and disposal plant comprises:
  a) a chemical waste treatment facility;
  b) a power source from said turbo-generated power plant;
  c) a treated waste outlet to disposal tank; and
  d) a waste inlet from facilities.

17. A man-made island resort complex with entertainment, educational and lodging facilities as recited in claim 14, wherein said desalinization plant comprises:
  a) a purification system;
  b) a sea water intake conduit to said purification system;
  c) an outtake conduit from said purification system to the sea;
  d) electricity from turbo-generated power plant;
  e) hot and cold fresh water distribution means; and
  f) a flow switch.

18. A man-made island resort complex with entertainment, educational and lodging facilities as recited in claim 1, wherein said entertainment and educational facilities include, but are not limited to:
  a) an 18-hole golf course;
  b) boat rentals for all kinds of water activities;
  c) an aquarium including:
    i) a whale open ocean habitat wherein certain habitat parameters are variable to trigger certain biological functions to mimic their natural habitat by providing water temperature variation to mimic migration scenario;
    ii) a shark open ocean habitat wherein certain habitat parameters are variable to trigger certain biological functions to mimic their natural habitat by providing water temperature variation to mimic migration scenario; and
    iii) a dolphin open ocean habitat wherein certain habitat parameters are variable to trigger certain biological functions to mimic their natural habitat by providing water temperature variation to mimic migration scenario;
  d) a floating nightclub;
  e) a planetarium;
  f) a theater;
  g) an underwater spa;
  h) a gym;
  i) volleyball courts;
  j) basketball courts;
  k) racquetball courts;
  l) an underwater ice skating and hockey ring;
  m) at least one swimming pool;
  n) a wave pool;
  o) an exotic bird sanctuary;
  p) a 100 foot high activity mountain providing means for participating in a plurality of activities including, but not limited to:
    i) a skateboard and BMX bike concrete wave rider;
    ii) a restaurant;
    iii) skydiving;
    iv) bungee jumping;
    v) rock tables for sitting;
    vi) a bobsled run from the mountain into the ocean at an 85 degree incline;
    vii) a waterfall;
    viii) hot air balloon rides;
    ix) an air cannon ride for shooting participants through the air into the ocean at a pre-selected angle;
    x) a giant slingshot ride having an elastomeric sling and collapsible seat for hurling participants through the air into the ocean;
    xi) an artificial reef for surfing;
    xii) parasailing;
    xiii) an arched bridge;
    xiv) an elevator;
    xv) a transparent pipe in said elevator;
    xvi) an arched bridge extending from said mountain to said bobsled run;
    xvii) white lights to illuminate said arched bridge at night;
    xviii) red lights to illuminate said mountain at night;
    xix) royal blue lights to illuminate said bobsled run at night;
    xx) means for delivering ocean water to said waterfall and said bobsled run; and
    xxi) means for delivering desalinated water for human and pet consumption;
  q) a simulated rain forest complete with real animals and mist and a computerized bulldozer that knocks down some simulated trees which return to their original position when the bulldozer leaves;
  r) an interactive wolf habitat in which participants can observe the natural behavior of wolves in a plurality of environments;
  s) a plurality of dining facilities;
  t) a plurality of shopping facilities; and
  u) an underwater water arcade shaped like a stingray.

19. A man-made island resort complex with entertainment, educational and lodging facilities as recited in claim 18, wherein said golf course is located on its own satellite island comprising:
  a) an arched access foot bridge from the man-made island resort complex including two dolphin waterfalls that cascade thereover;
  b) a structure in the shape of a golf ball on a golf tee with restaurants in the portion resembling the ball, a clubhouse overlooking the golf course in the portion resembling the tee, and underwater pro shops at the base of the tee;
  c) at least one ocean water trap with underwater ball trap comprised of hard plastic with an arcuate bowl like portion having a peripheral lip with the entire unit having fine holes extending therethrough; and
  d) an ocean water trap comprising a net that extends upward in a substantially vertical manner around the periphery of the island to prevent errant golf balls from landing in the ocean.

20. A man-made island resort complex with entertainment, educational and lodging facilities as recited in claim 19, wherein said holes in the peripheral lip of said ocean water trap with underwater ball trap are irrigation holes having sea grass growing therethrough to maintain the position of said ocean water trap with underwater ball trap and the holes in the bowl portion thereof allow ocean water to pass therthrough to fill the water trap while retaining any golf balls therein to prevent them from entering the ocean, the irrigation holes with the underwater ball trap also serve as a self ventilation to keep it clean.

21. A man-made island resort complex with entertainment, educational and lodging facilities as recited in claim 18, wherein said floating nightclub is located on its own satellite island that is supported by concrete stanchions and accessed from the man-made island resort complex by an arched footbridge.

22. A man-made island resort complex with entertainment, educational and lodging facilities as recited in claim 18, wherein said floating nightclub comprises:
  a) a security check at the entrance;
  b) one or more interior waterfalls fed by ocean water and illuminated by royal blue lights;
  c) a see-through, hunter green stage;
  d) a see-through dance floor illuminated by red lights;
  e) a plurality of see-through tables with chairs;
  f) at least one bar area; and
  g) a net surrounding said island of said floating night club that is above water to prevent fish from getting trapped therein.

23. A man-made island resort complex with entertainment, educational and lodging facilities as recited in claim 18, wherein said arcade is in the shape of a stingray and comprises:
  a) a plurality of games; and
  b) a restaurant in the shape of an octopus.

24. A man-made island resort complex with entertainment, educational and lodging facilities as recited in claim 18, wherein said compressed air cannon comprises:
a) a cannon;
b) a compressed air chamber within said cannon;
c) an air compressor;
d) a plastic tube communicating between said air compressor and said compressed air chamber;
e) a pressure valve in line between said air compressor and said compressed air chamber;
f) a generator to power said air compressor; and
g) means for selectively positioning said cannon through a range of horizontal and vertical planes.

25. A man-made island resort complex with entertainment, educational and lodging facilities as recited in claim 18, wherein said entertainment and educational facilities further include:
a) an underwater paint ball war game;
b) an underwater whale maze;
c) an underwater medieval gauntlet;
d) underwater water volleyball;
e) underwater laser dodge;
f) underwater virtual reality games;
g) an underwater bowling alley;
h) racquetball courts;
i) an underwater spa with all the amenities;
j) an above water gym with a see-through Jacuzzi;
k) an underwater convention center with conference rooms; and
l) see-through walkways whenever applicable.

* * * * *